(12) United States Patent
Zheng et al.

(10) Patent No.: US 12,100,084 B2
(45) Date of Patent: Sep. 24, 2024

(54) ADJUSTMENT METHOD AND APPARATUS FOR RENDERING HIERARCHY ORDER

(71) Applicant: Beijing Zitiao Network Technology Co., Ltd., Beijing (CN)

(72) Inventors: Hanqi Zheng, Beijing (CN); Chuyu Ruan, Beijing (CN)

(73) Assignee: Beijing Zitiao Network Technology Co., Ltd. (CN)

( * ) Notice: Subject to any disclaimer, the term of this patent is extended or adjusted under 35 U.S.C. 154(b) by 0 days.

(21) Appl. No.: 18/538,828

(22) Filed: Dec. 13, 2023

(65) Prior Publication Data

US 2024/0112387 A1   Apr. 4, 2024

Related U.S. Application Data

(63) Continuation of application No. PCT/CN2023/115255, filed on Aug. 28, 2023.

(30) Foreign Application Priority Data

Aug. 31, 2022   (CN) .......................... 202211065529.2

(51) Int. Cl.
G06T 11/60        (2006.01)
(52) U.S. Cl.
CPC .......... *G06T 11/60* (2013.01); *G06T 2200/24* (2013.01)
(58) Field of Classification Search
CPC .......................... G06T 11/60; G06T 2200/24
See application file for complete search history.

(56) References Cited

U.S. PATENT DOCUMENTS 6,337,916 B1 *  1/2002  Boyd ..................... H04N 5/262
                                                 348/E5.051
8,610,725 B2 * 12/2013  Sandmel ............ H04N 5/44504
                                                        712/34
(Continued)

FOREIGN PATENT DOCUMENTS

CN        108536441 A      9/2018
CN        112346811 A      2/2021
(Continued)

OTHER PUBLICATIONS

International Search Report and Written Opinion received for PCT Patent Application No. PCT/CN2023/115255, mailed on Sep. 27, 2023, 9 pages (2 pages of English Translation and 7 pages of Original Document).

*Primary Examiner* — Phi Hoang

(57) ABSTRACT

Embodiments of the present disclosure provide an adjustment method and apparatus for a rendering hierarchy order, and the method includes: displaying, in response to an instruction triggered for a target moment position of a video editing timeline track, a rendering hierarchy adjustment panel corresponding to the target moment position, displaying identifiers of a plurality of editing material segments, whose time intervals covered on the video editing timeline track includes the target moment position, in the rendering hierarchy adjustment panel according to an initial order; moving for the identifier of the editing material segment and adjusting the display position of the identifier of the editing material segment, so that the identifiers of the plurality of editing material segments are displayed according to a target order; and then determining a target rendering hierarchy order of the plurality of editing material segments according to the target order.

20 Claims, 19 Drawing Sheets

(56) References Cited

U.S. PATENT DOCUMENTS

| | | | | |
|---|---|---|---|---|
| 9,818,451 B1* | 11/2017 | Tyagi | ............... | G11B 27/3081 |
| 9,940,396 B1* | 4/2018 | Willhoit | ............... | G06F 16/9535 |
| 2014/0270708 A1 | 9/2014 | Girgensohn et al. | | |
| 2015/0127626 A1* | 5/2015 | Park | ............... | G06F 16/7837 |
| | | | | 707/706 |
| 2019/0104259 A1* | 4/2019 | Angquist | ............... | G11B 27/34 |
| 2022/0122639 A1* | 4/2022 | Townsend | ............... | H04N 9/79 |

FOREIGN PATENT DOCUMENTS

| | | | |
|---|---|---|---|
| CN | 113891113 A | 1/2022 | |
| CN | 114827722 A | 7/2022 | |
| KR | 10-2020-0033083 A | 3/2020 | |

\* cited by examiner

In response to a first instruction triggered for a target moment position of a video editing timeline track, displaying a rendering hierarchy adjustment panel corresponding to the target moment position; where identifiers of a plurality of editing material segments are displayed in the rendering hierarchy adjustment panel according to an initial order, a time interval covered by the plurality of editing material segments on the video editing timeline track comprises the target moment position, the initial order of the identifiers of the plurality of editing material segments is consistent with an initial rendering hierarchy order of the plurality of editing material segments ~ S101

In response to a moving operation for an identifier of at least one editing material segment of the identifiers of the plurality of editing material segments, adjusting a display position of the identifier of the at least one editing material segment in the rendering hierarchy adjustment panel, causing the identifiers of the plurality of editing material segments to be displayed in the rendering hierarchy adjustment panel according to a target order corresponding to the identifiers of the plurality of editing material segments ~ S102

In response to a second instruction triggered for the rendering hierarchy adjustment panel, determining a target rendering hierarchy order of the plurality of editing material segments according to the target order of the identifiers of the plurality of editing material segments ~ S103

FIG. 1

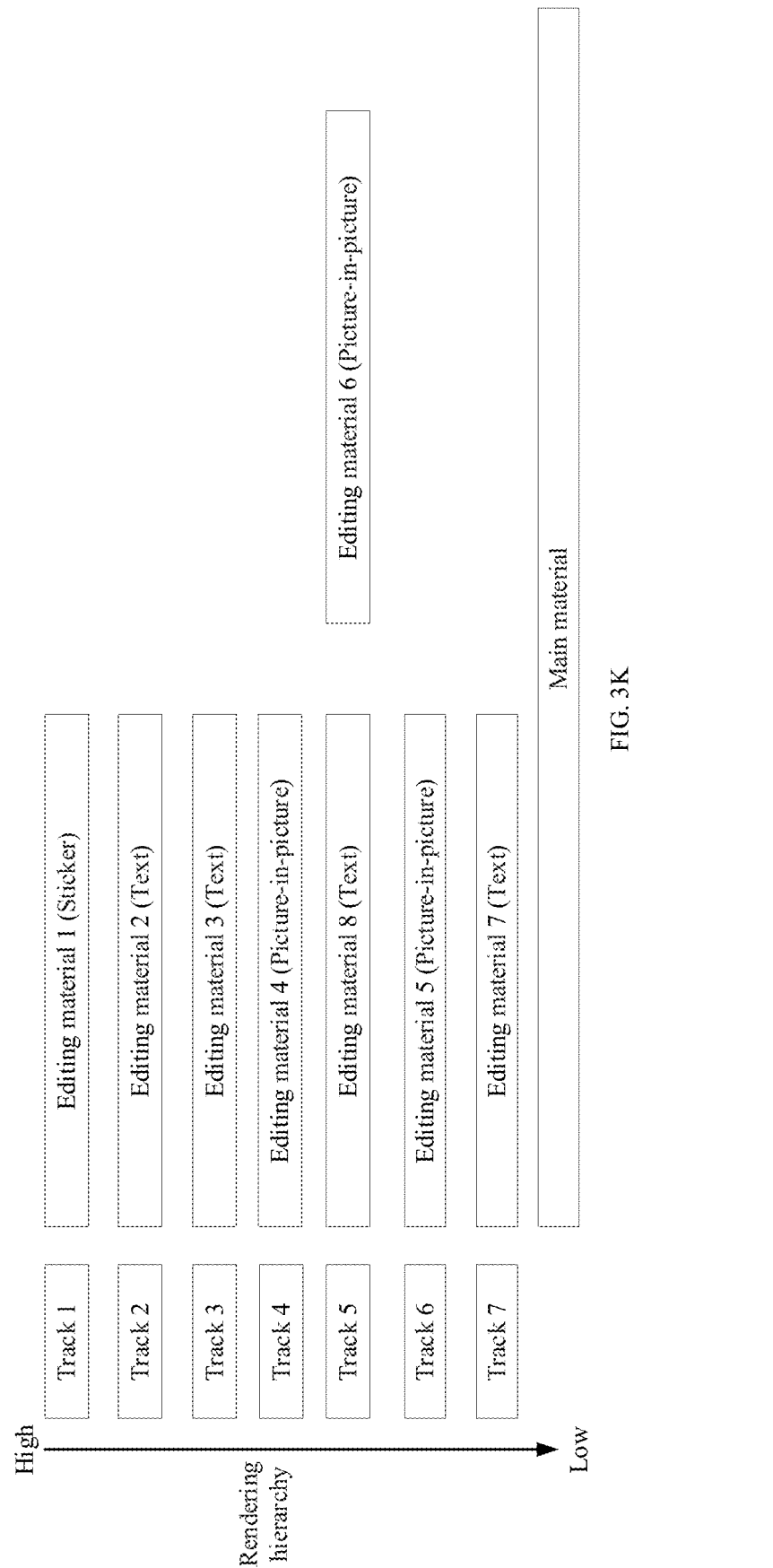

ADJUSTMENT METHOD AND APPARATUS FOR RENDERING HIERARCHY ORDER

CROSS-REFERENCE TO RELATED APPLICATION

The present application is a continuation of International Patent Application No. PCT/CN2023/115255, filed on Aug. 28, 2023, which claims priority of the Chinese Patent Application No. 202211065529.2, filed on Aug. 31, 2022, and the entire content disclosed by the aforementioned patent applications is incorporated herein by reference as part of the present application.

TECHNICAL FIELD

Embodiments of the present disclosure relate to an adjustment method and apparatus for a rendering hierarchy order.

BACKGROUND

Rendering is the last process of drawing an image by a computer, thus ultimately making the image conform to a 3D scene. With an increasing demand of a user for a visual effect in a multimedia content, the user often edits a main material, for example, adding a sticker, a special effect, and a picture-in-picture to the main material, so as to obtain the visually rich multimedia content. In such a rendering scenario, a rendering hierarchy order is set in advance for different categories of editing materials, and then the main material and the added editing materials are rendered according to the preset rendering hierarchy order. However, the visual effect presented in the edited multimedia content obtained by the above rendering method often fails to meet the user's expectation.

SUMMARY

In order to solve the above technical problems, the present disclosure provides an adjustment method and apparatus for a rendering hierarchy order.

In a first aspect, the present disclosure provides an adjustment method for a rendering hierarchy order, which includes:
  in response to a first instruction triggered for a target moment position of a video editing timeline track, displaying a rendering hierarchy adjustment panel corresponding to the target moment position; identifiers of a plurality of editing material segments being displayed in the rendering hierarchy adjustment panel according to an initial order, a time interval covered by the plurality of editing material segments on the video editing timeline track comprising the target moment position, the initial order of the identifiers of the plurality of editing material segments being consistent with an initial rendering hierarchy order of the plurality of editing material segments;
  in response to a moving operation for an identifier of at least one editing material segment of the identifiers of the plurality of editing material segments, adjusting a display position of the identifier of the at least one editing material segment in the rendering hierarchy adjustment panel, causing the identifiers of the plurality of editing material segments to be displayed in the rendering hierarchy adjustment panel according to a target order corresponding to the identifiers of the plurality of editing material segments; and
  in response to a second instruction triggered for the rendering hierarchy adjustment panel, determining a target rendering hierarchy order of the plurality of editing material segments according to the target order of the identifiers of the plurality of editing material segments.

In a second aspect, the present disclosure provides an adjustment apparatus for a rendering hierarchy order, which includes:
  a display module, used to display, in response to a first instruction triggered for a target moment position of a video editing timeline track, a rendering hierarchy adjustment panel corresponding to the target moment position; identifiers of a plurality of editing material segments being displayed in the rendering hierarchy adjustment panel according to an initial order, a time interval covered by the plurality of editing material segments on the video editing timeline track comprising the target moment position, the initial order of the identifiers of the plurality of editing material segments being consistent with an initial rendering hierarchy order of the plurality of editing material segments;
  the display module, further used to adjust, in response to a moving operation for an identifier of at least one editing material segment of the identifiers of the plurality of editing material segments, a display position of the identifier of the at least one editing material segment in the rendering hierarchy adjustment panel, causing the identifiers of the plurality of editing material segments to be displayed in the rendering hierarchy adjustment panel according to a target order corresponding to the identifiers of the plurality of editing material segments; and
  a rendering hierarchy order determination module, used to determine, in response to a second instruction triggered for the rendering hierarchy adjustment panel, a target rendering hierarchy order of the plurality of editing material segments according to the target order of the identifiers of the plurality of editing material segments.

In a third aspect, the present disclosure provides an electronic device, which includes a memory and a processor.

The memory is configured to store a computer program instruction.

The processor is configured to execute the computer program instruction, causing the electronic device to implement the adjustment method for the rendering hierarchy order according to the first aspect.

In a fourth aspect, the present disclosure provides a non-transitory computer-readable storage medium, which includes a computer program instruction. An electronic device executes the computer program instruction, causing the electronic device to implement the adjustment method for the rendering hierarchy order according to the first aspect.

In a fifth aspect, the present disclosure provides a computer program product, upon execution of the computer program product by an electronic device, causes the electronic device to implement the adjustment method for the rendering hierarchy order according to the first aspect.

BRIEF DESCRIPTION OF THE DRAWINGS

The accompanying drawings herein, which are incorporated into and form a part of the specification, illustrate embodiments consistent with the present disclosure, and are used in conjunction with the specification to explain the principles of the present disclosure.

To more clearly illustrate the embodiments of the present disclosure, the accompanying drawings required to be used for the embodiments are briefly described in the following, obviously, for those skilled in the art, other drawings can be obtained based on these drawings without any inventive work.

FIG. 1 is a flowchart of an adjustment method for a rendering hierarchy order provided by an embodiment of the present disclosure;

FIG. 3A to FIG. 3K are schematic diagrams of rendering hierarchy adjustment logic provided by embodiments of the present disclosure;

DETAILED DESCRIPTION

Figure 2A:
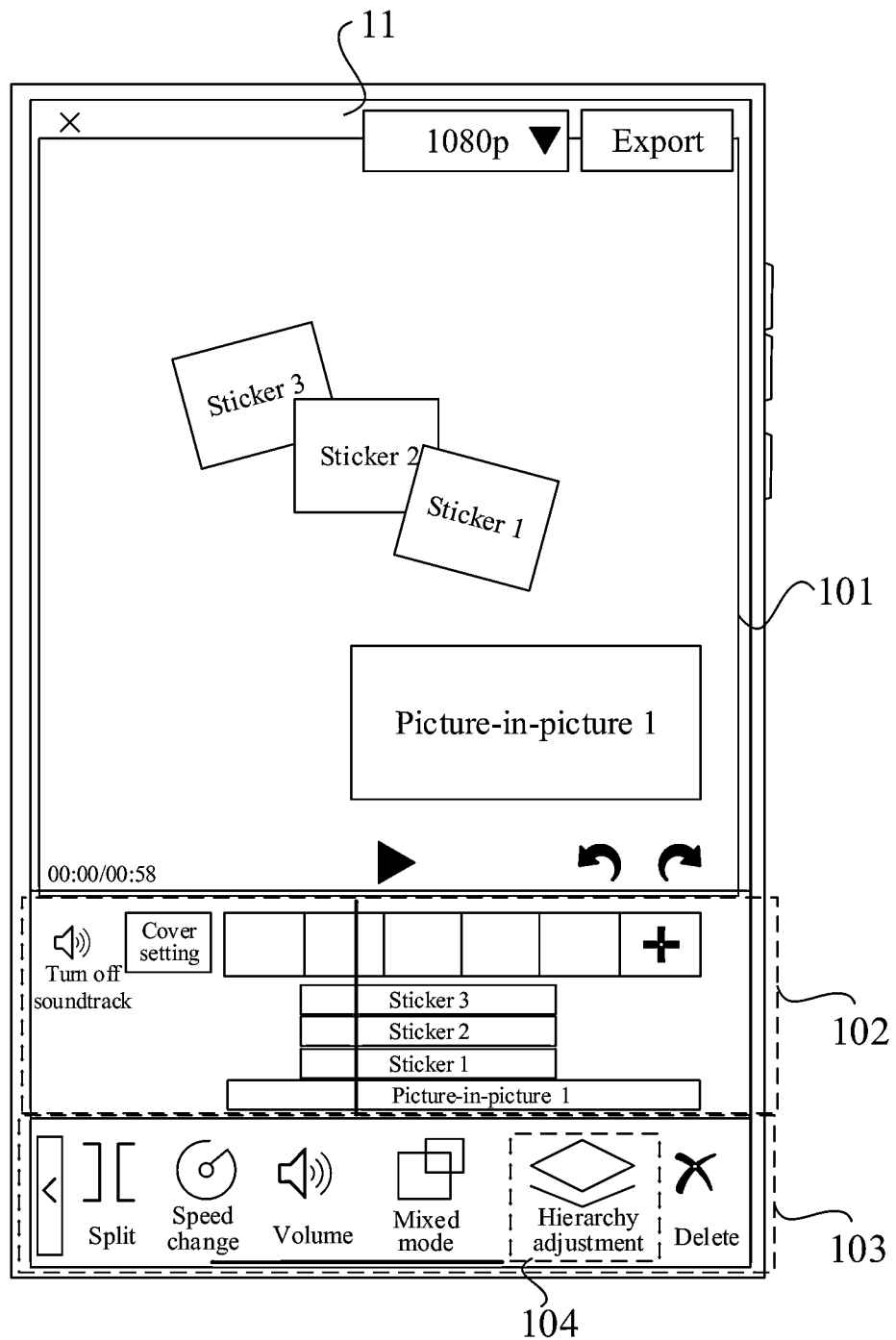
FIG. 2A to FIG. 2F are schematic diagrams of human-computer interaction interfaces provided by embodiments of the present disclosure.

In order to understand the above objects, features, and advantages of the present disclosure more clearly, the solutions of the present disclosure are further described below. It should be noted that embodiments and features in the embodiments of the present disclosure may be combined with each other without conflict.

Many specific details are set forth in the following description to facilitate a full understanding of the present disclosure, but the present disclosure may also be implemented in other ways different from those described herein; obviously, the embodiments in the specification are only a part but not all of the embodiments of the present disclosure.

Currently, the rendering hierarchy order of editing material segments of different categories is fixed, and the rendering hierarchy order of editing material segments of the identical category is sorted in accordance with the addition time of the editing material segments, and the visual effect presented by the video rendered according to the above method is substantially limited, and cannot satisfy the user's expectation. For example, the order of different rendering hierarchies in an editing tool or editing software is, from high to low, a text, a sticker, a picture-in-picture, and a main material. According to this order, it is not possible to move the text/sticker to the bottom of the picture-in-picture, nor is it possible to edit the picture-in-picture, text, and sticker in an interspersed manner, thus failing to meet the user's needs.

To solve the above problems, embodiments of the present disclosure provide an adjustment method and apparatus for a rendering hierarchy order, and the method includes: displaying, in response to a first instruction triggered for a target moment position of a video editing timeline track, a rendering hierarchy adjustment panel corresponding to the target moment position, the identifiers of a plurality of editing material segments whose time intervals covered on the video editing timeline track includes the target moment position are displayed in the rendering hierarchy adjustment panel according to an initial order; moving for the identifier of the editing material segment and adjusting the display position of the identifier of the editing material segment, so that the identifiers of the plurality of editing material segments are displayed according to a target order corresponding to the identifiers of the plurality of editing material segments; and then determining a target rendering hierarchy order of the plurality of editing material segments according to the target order of the identifiers of the plurality of editing material segments. The method can implement to freely adjust the rendering hierarchy order of the editing material segments to meet the user's video editing needs.

To solve the above problems and improve the flexibility of rendering as well as the visual effect presented by the edited video, embodiments of the present disclosure provide an adjustment method and apparatus for a rendering hierarchy order, in which, in response to the instruction input by the user, a rendering hierarchy adjustment panel corresponding to a target moment position is displayed, identifiers respectively corresponding to a plurality of editing material segments are displayed in the rendering hierarchy adjustment panel according to the current rendering hierarchy order of the plurality of editing material segments, and the rendering hierarchy order of the editing material segment is adjusted by moving the display position of the identifier corresponding to the editing material segment. The method provided in the present disclosure enables the user to freely adjust the rendering hierarchy order of the editing material segment, so that the user can freely exert creativity. Furthermore, in the present disclosure, the rendering hierarchy adjustment interface presented to the user displays the identifiers respectively corresponding to various editing material segments according to the rendering hierarchy order, which can facilitate the user to quickly understand and use.

Exemplarily, the adjustment method for the rendering hierarchy order provided by the present disclosure may be executed by the adjustment apparatus for the rendering hierarchy order provided by the present disclosure, the adjustment apparatus for the rendering hierarchy order may be implemented by any software and/or hardware. Exemplarily, the adjustment apparatus for the rendering hierarchy order may be an electronic device, and the electronic device may include, but is not limited to: a mobile phone, a tablet computer, a wearable electronic device, a laptop computer, an ultra-mobile personal computer (UMPC), a netbook, a personal digital assistant (PDA), and the like. The present disclosure does not limit the specific type of the electronic device. The present disclosure does not limit the type of operating system of the electronic device, for example, an Android system, a Linux system, a Windows system, an iOS system, and the like.

The adjustment method for a rendering hierarchy order provided by the present disclosure is next described in detail through several specific examples, in conjunction with scenarios and drawings.

FIG. 1 is a flowchart of an adjustment method for a rendering hierarchy order provided by an embodiment of the present disclosure. Referring to FIG. 1, the method of the present embodiment includes:

S101, in response to a first instruction triggered for a target moment position of a video editing timeline track, displaying a rendering hierarchy adjustment panel corresponding to the target moment position; where identifiers of a plurality of editing material segments are displayed in the rendering hierarchy adjustment panel according to an initial order, a time interval covered by the plurality of editing material segments on the video editing timeline track comprises the target moment position, the initial order of the identifiers of the plurality of editing material segments is consistent with an initial rendering hierarchy order of the plurality of editing material segments.

The user can launch an editing tool (e.g., a video editing application) installed in the electronic device and create a corresponding editing project, which can be understood as an editing draft, including the imported original video and original audio as well as the indication information of the editing operation. In the editing project, there is a video editing timeline track, and the imported original video, the imported original audio, the editing material segment added by the editing operation, and the like cover the corresponding time intervals on the video editing timeline track according to their respective starting moments and durations.

In the process of video editing, the user can add editing material segments of different categories into the editing project through an editing operation, such as a text, a sticker, a filter, a picture-in-picture, and the like, and one or more editing material segments can be added for each category. In some cases, after the user adds editing material segments of various categories to the editing project, and edits or adjusts the display durations of the editing material segments, there may be a plurality of editing material segments at some moment positions on the video editing timeline track, and the covering relationship between these editing material segments corresponds to the rendering hierarchy order, when the image positions of the plurality of editing material segments overlap with each other, the editing material segment with a high rendering hierarchy obscures the editing material segment with a low rendering hierarchy.

The target moment position is a moment position on the video editing timeline track and is a current preview moment position.

In some embodiments, at the target moment position, the editing tool may present a visualization entrance to the user, such that the user inputs the first instruction to the editing tool by operating the visualization entrance. For example, at the target moment position, after the user adds or edits the editing material segment, a window or panel may be displayed on the interface of the editing tool, and may include entrances or controls for various editing operations, and the user may edit the editing material segment by operating these entrances or controls. An entrance for accessing the rendering hierarchy adjustment panel is included, and a first instruction is input to the editing tool by an operation such as clicking the entrance.

The editing tool, in response to the first instruction, determines the plurality of editing material segments whose time intervals cover the target moment position, displays a rendering hierarchy adjustment panel, and displays the identifiers of the plurality of editing material segments in the rendering hierarchy adjustment panel according to an initial order. The plurality of editing material segments may be editing material segments of a specified category or editing material segments of all categories, which is not limited in the present disclosure. When the first instruction is triggered for the editing material segment of the specified category, which can be understood as the editing tool implementing the free adjustment of the rendering hierarchy order of a single module; and when the first instruction is triggered for the editing material segments of all categories, which can be understood as the editing tool implementing the free adjustment of the rendering hierarchy order of all categories.

It should be noted that the editing material segments of "all categories" mentioned here are editing material segments of a first category, the editing material segments of the first category has an impact on the visual effect of the video editing. For example, the first category may include an image category, which may include visual elements such as a text, a sticker, a picture-in-picture, a filter/adjustment, and the like. The editing material segment whose time interval on the video editing timeline track covers the target moment position may further include an editing material segment of a second category, the editing material segment of the second category may be understood as not having an impact on the visual effect of the video editing, for example, the second category may include a non-image category, and may include the audio material.

The specified category may be one or more subcategories included in the aforementioned first category, for example, the first category is an image category, the image category may include a plurality of subcategories such as a text, a sticker, a picture-in-picture, a filter, an adjustment, and the like, and the specified category may be a text category or a sticker category.

When the rendering hierarchy order of the editing material segment has not been adjusted, the initial order may be determined as follows: presetting the rendering hierarchy order of editing material segments of different categories, for example, the preset rendering hierarchy order is, from high to low, a text, a sticker, a filter, a picture-in-picture, a main material, of course, the preset order can also be any other order, and this is only an example. The rendering hierarchy order of the editing material segments of the identical category is arranged according to the time of adding the editing material segments, the rendering hierarchy of the editing material segment added at an earlier time is lower, and the rendering hierarchy of the editing material segment added at a later time is higher. When the rendering hierarchy order of the editing material segments has been adjusted, the current rendering hierarchy order of the respective editing material segments is the initial order.

The identifiers respectively corresponding to the plurality of editing materials may include: a thumbnail image corresponding to the editing material and/or a description text of the editing material. The description text may be, but is not limited to, a name, category information, and the like.

The initial rendering hierarchy order of the plurality of editing material segments and the display positions of the identifiers corresponding to the editing material segments, respectively, are closely related, so that the user can quickly and clearly understand the situation of the current rendering hierarchy order of the plurality of editing material segments for which the first instruction is directed through the content displayed in the rendering hierarchy adjustment page.

S102, in response to a moving operation for an identifier of at least one editing material segment of the identifiers of the plurality of editing material segments, adjusting a display position of the identifier of the at least one editing material segment in the rendering hierarchy adjustment panel, causing the identifiers of the plurality of editing material segments to be displayed in the rendering hierarchy adjustment panel according to a target order corresponding to the identifiers of the plurality of editing material segments.

In some embodiments, the user may drag the identifier corresponding to the editing material segment displayed in the rendering hierarchy adjustment panel from a current display position to another display position and then release it to move the display position of the identifier of the editing material segment, thereby adjusting the order of the identifiers of the plurality of editing material segments. If the user needs to adjust the plurality of editing material segments, the user may perform the moving operation on the plurality of editing material segments one by one.

For example, there are identifiers of three editing material segments in the rendering hierarchy adjustment panel, the three editing material segments are an editing material segment A, an editing material segment B, and an editing material segment C, respectively. The rendering hierarchy, in a descending order, is A>B>C, and the thumbnails of the three editing material segments are arranged and displayed from left to right according to the rendering hierarchy order from high to low, among them, the rightmost thumbnail is the thumbnail of the editing material segment A, and the middle thumbnail is the thumbnail of the editing material segment B, and the leftmost thumbnail is the thumbnail of the editing material segment C. If the user drags the thumbnail of the editing material segment C to the right side of the editing material segment A, the corresponding thumbnails of the editing material segment A and the editing material segment B respectively are moved to the right, and after the adjustment, the thumbnail of the editing material segment C is on the rightmost side, the thumbnail of the editing material segment A is in the middle, and the thumbnail of the editing material segment B is on the leftmost side, and the order of the three thumbnails of the three editing material segments changes.

In some embodiments, the user may also adjust the display position of the identifier corresponding to the identical editing material segment several times to adjust the rendering hierarchy order of the editing material segment several times. For example, the user may adjust the display position of the thumbnail of the editing material segment C several times, such as by first adjusting the thumbnail of the editing material segment C to the right side of the thumbnail of the editing material segment A, and then re-adjusting the thumbnail of the editing material segment C to the middle of the thumbnail of the editing material segment A and the thumbnail of the editing material segment B, thereby adjusting the order of the editing material segments A, B, and, C several times.

S103, in response to a second instruction triggered for the rendering hierarchy adjustment panel, determining a target rendering hierarchy order of the plurality of editing material segments according to the target order of the identifiers of the plurality of editing material segments.

The method provided in the present embodiment can achieve that a user can freely adjust the rendering hierarchy order for the editing material segments of a single module or all categories, so that the user can freely give play to creativity to obtain a video that meets the desired visual effect. In addition, by moving the display position of the identifier corresponding to the editing material segment, the user can achieve to adjust the rendering hierarchy order corresponding to the editing material segment, which is simple to operate and can convenient for the user to quickly understand and use the rendering hierarchy adjustment function provided by the editing tool. In the present embodiment, the rendering hierarchy adjustment panel presented to the user displays the identifiers respectively corresponding to respective editing material segments according to the rendering hierarchy order, which can facilitate the user to quickly understand and use the rendering hierarchy adjustment function provided by the editing tool.

On the basis of the embodiment illustrated in FIG. 1, assuming that the first instruction is triggered for the editing material segment of a specified category, the editing tool may also can also support the user to switch the display of editing material segments of all categories for the convenience of the user. As a possible implementation, in response to a third instruction triggered for the rendering hierarchy adjustment panel, displaying identifiers of editing material segments, whose time intervals covered on the video editing timeline track comprises the target moment position, of all categories in the rendering hierarchy adjustment panel. The user may trigger the display of a specific pop-up window through a specified entrance in the rendering hierarchy adjustment panel, and trigger the third instruction by manipulating a configuration item in the specific pop-up window. Thereafter, the editing tool, in response to a moving operation for an identifier of at least one editing material segment of identifiers of the editing material segments of all categories, adjusts a display position of the identifier of the at least one editing material segment of the identifiers of the editing material segments of all categories in the rendering hierarchy adjustment panel, causing the identifiers of the editing material segments of all categories to be displayed in the rendering hierarchy adjustment panel according to a target order corresponding to the identifiers of the editing material segments of all categories; and determining a target rendering hierarchical order of the editing material segments of all categories according to the target order of the identifiers of the editing material segments of all categories.

On the basis of the embodiment illustrated in FIG. 1, the editing tool can follow the user's operation in real time, determine the rendering hierarchy order of the plurality of editing material segments, whose time intervals on the video editing timeline track covers the target moment position, according to the order of identifiers of respective editing material segments, and render to display, so as to facilitate the user to preview and adjust in real time the editing effect of the rendering hierarchy order.

It should be noted that the user can adjust the position of the identifier of the identical editing material segment several times, and the editing tool can follow the user's operation for rendering and displaying in real time, and preview in real-time the editing effect of each moving operation.

In combination with the example in step S102, for example, the user first adjusts the thumbnail of the editing material segment C to the right side of the thumbnail of the editing material segment A, then the editing tool renders and displays the video frame image at the current preview position as well as the images of the three editing material segments in real time according to a rendering hierarchy order, which is, from high to low, C>A>B; thereafter, the user readjusts the thumbnail of the editing material segment C to the middle of the thumbnail of the editing material segment A and the thumbnail of the editing material segment B, then the editing tool renders and displays the video frame image at the current preview position and the three editing material segments in real time according to the rendering hierarchy order, which is, from high to low, A>C>B.

On the basis of the embodiment illustrated in FIG. 1, the user may also create an editing material segment to the editing project. As a possible implementation, the editing tool, in response to a fourth instruction triggered for the target moment position, creates a newly created editing material segment at the target moment position and determines an initial rendering hierarchy corresponding to the newly created editing material segment according to a preset rendering hierarchy order.

The preset rendering hierarchy order is, in descending order, a text, a sticker, a filter, an adjustment, and a picture-in-picture; the determining an initial rendering hierarchy corresponding to the newly created editing material segment according to a preset rendering hierarchy order includes: in response to the newly created editing material segment being the text, determining that the initial rendering hierarchy of the newly created editing material segment is a highest hierarchy; in response to the newly created editing material segment being the sticker, determining that the initial rendering hierarchy of the newly created editing material segment is lower than a rendering hierarchy of a text editing material segment with a lowest hierarchy; in response to the newly created editing material segment being the filter or the adjustment, determining that the initial rendering hierarchy of the newly created editing material segment is lower than a rendering hierarchy of a sticker editing material segment with a lowest hierarchy; and in response to the newly created editing material segment being the picture-in-picture, determining that the initial rendering hierarchy of the newly created editing material segment is lower than a rendering hierarchy of a filter or adjustment editing material segment with a lowest hierarchy.

It should be understood that the preset rendering hierarchy order may also be other orders and is not limited to the above examples, for example, the sticker may be higher than the text, and the picture-in-picture may be higher than the filter and the adjustment, which may be set flexibly according to the needs.

The following is an exemplary illustration of a human-computer interaction process of an adjustment method for a rendering hierarchy order provided by the present disclosure through interaction interfaces illustrated in FIGS. 2A to 2F. In the following example, a case that the electronic device is a mobile phone and an editing tool (e.g., a video editing application, hereinafter referred to as the application 1) is installed in the mobile phone is taken as an example for illustration.

The user launches the application 1 installed in the mobile phone, imports the original video into the application 1, and adds four editing material segments at the current preview position, namely: the picture-in-picture 1, the sticker 1, the sticker 2, and the sticker 3, the picture-in-picture 1 is added at a later time than the sticker 1, the sticker 1 is added at a later time than the sticker 2, and the sticker 2 is added at a later time than the sticker 3. Therefore, in response to not adjusting the rendering hierarchy order, the rendering hierarchy of the sticker 1 is higher than the rendering hierarchy of the sticker 2, the rendering hierarchy of the sticker 2 is higher than the rendering hierarchy of the sticker 3, and the rendering hierarchy of the picture-in-picture 1 is the lowest.

It should be noted that editing materials of some categories may be displayed for a preset length of time after being added, such that these editing materials may be understood as editing material segments. As illustrated in FIG. 2A to FIG. 2E, the sticker 1 to sticker 3 added at the current preview position may also be understood as the sticker segment 1 to sticker segment 3.

By newly adding or selecting an added editing material segment by the user, the application 1 displays an editing tool panel corresponding to the editing material to the user, and the editing tool panel may include an entrance for accessing the rendering hierarchy adjustment panel. The editing tool panel may also include other entrances or controls, which are not limited by the present disclosure.

Exemplarily, FIG. 2A exemplarily illustrates an editing tool panel corresponding to a sticker displayed by the application 1 after the user has added the sticker 3 at the current preview position. Referring to FIG. 2A, the user interface 11 includes: a region 101, a region 102, a region 103, and an entrance 104.

The region 101 is a preview region for displaying a preview effect of a corresponding preview position. The present disclosure does not limit the size, display position, shape, and other parameters of the region 101. For example, as may be illustrated with reference to FIG. 2A, the region 101 may be rectangular and located in the middle region of the user interface 11.

The region 102 is used to display the original video as well as respective added editing material segments according to the video editing timeline track. A bold black vertical line in the region 102 is used to indicate the current preview position, for example, the target moment position described above. The region 102 may also provide an entrance for adding a video, a control to turn off the video soundtrack, and the like.

The region 103 is used to display an editing tool panel, the editing tool panel is used to provide an entrance or control corresponding to an editing operation. FIG. 2A exemplarily illustrates displaying the editing tool panel corresponding to the sticker in the region 103 after the user newly creates the sticker 3. The region 102 includes an entrance 104 for accessing the rendering hierarchy adjustment panel. It should be understood that if the user newly creates other editing material segment or clicks on an image region corresponding to other editing material segment in the region 101 or clicks on an identifier corresponding to an editing material segment in the region 102, an editing tool panel corresponding to the newly created editing material segment or to the selected other editing material segment may be displayed in the region 103.

The entrance 104 is used to access the rendering hierarchy adjustment panel for a user to adjust a rendering hierarchy order of one or more editing martials whose time intervals cover the current preview position. The present disclosure does not limit the implementation way of the entrance 104, in which the entrance 104 can be implemented by one or more ways such as an icon, a text, an image, a symbol, and the like. For example, as illustrated in FIG. 2A, the entrance 104 is implemented by the way of combining an icon with a text "rendering hierarchy". In addition, the present disclosure does not limit the size, display position, color, and other display parameters of the entrance 104.

The application 1 receives a triggering operation (e.g., a click operation) by the user on the entrance 104, the application 1 may display a rendering hierarchy adjustment panel and display the identifiers of the editing material segments of a single module (i.e., a single specified category) in the rendering hierarchy adjustment panel according to an initial order, that is, displaying the identifiers of all the stickers whose time intervals cover the current preview position in the rendering hierarchy adjustment panel.

When the identifiers of the editing material segments of a single module is displayed by default in the rendering hierarchy adjustment panel, the specified category is associated with an entrance or path to the rendering hierarchy adjustment panel.

For example, if the entrance for accessing the rendering hierarchy adjustment panel is located in the editing tool panel corresponding to the sticker, the identifiers of all stickers whose time intervals cover the current preview position are displayed by default in the rendering hierarchy adjustment panel. Similarly, if the entrance for accessing the rendering hierarchy adjustment panel is located in the editing tool panel corresponding to the picture-in-picture, the identifiers of all picture-in-pictures whose time intervals cover the current preview position are displayed by default in the rendering hierarchy adjustment panel. Similarly, if the entrance for accessing the rendering hierarchy adjustment panel is located in the editing tool panel corresponding to the text, the identifiers of all texts whose time intervals cover the current preview position are displayed by default in the rendering hierarchy adjustment panel. Other cases are similar and are not exemplified here one by one.

Figure 2B:
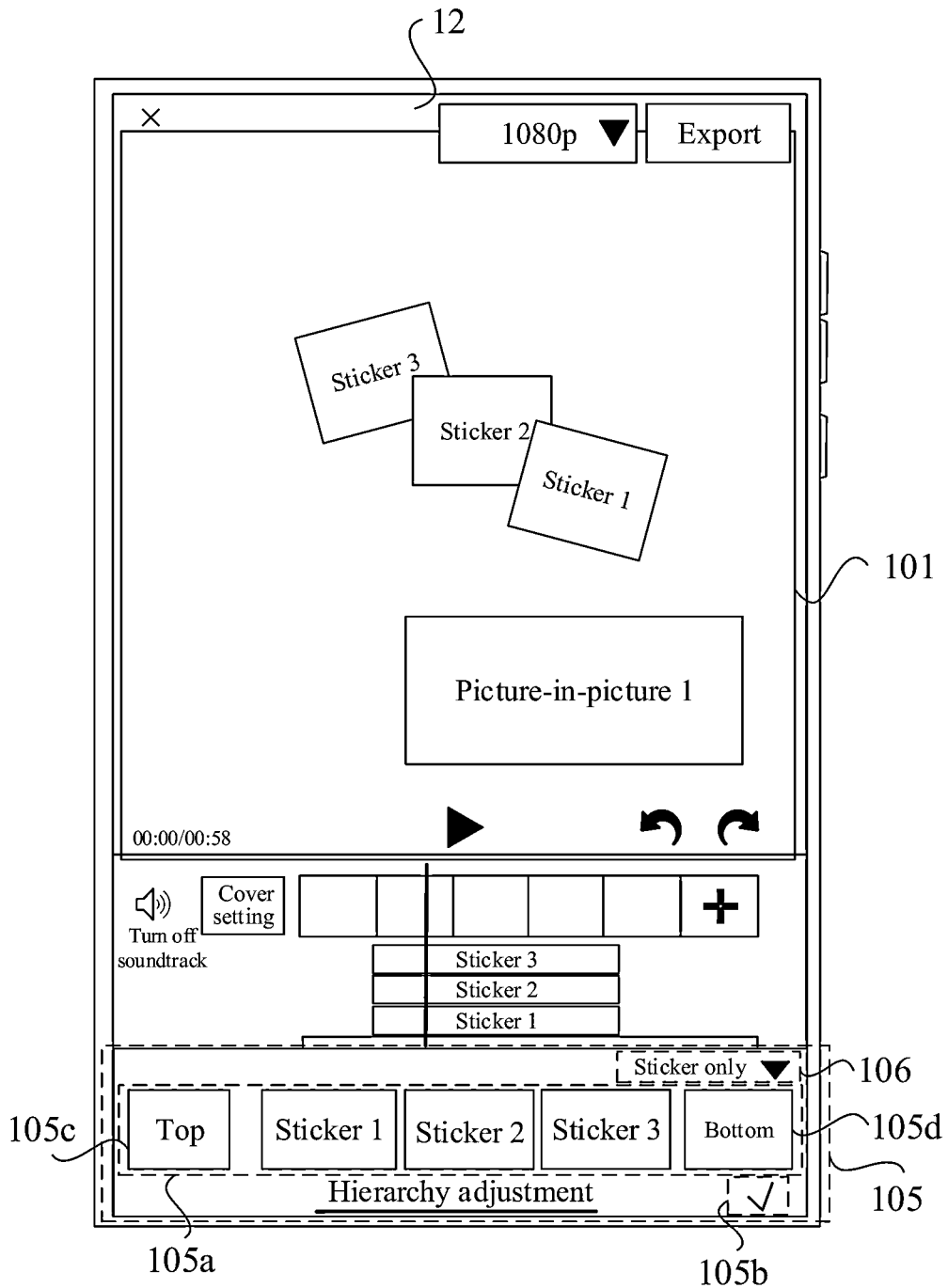

It should be understood that by accessing the rendering hierarchy adjustment panel through the entrance 104 illustrated in FIG. 2B, the identifiers of the editing material segments of all categories can also be displayed by default in the rendering hierarchy adjustment panel.

Based on the embodiment illustrated in FIG. 2A, the application 1, in response to a triggering operation on the entrance 104 by the user, exemplarily displays on the mobile phone a user interface 12 as illustrated in FIG. 2B, the user interface 12 includes a region 105.

The region 105 is used to display the rendering hierarchy adjustment panel. The rendering hierarchy adjustment panel includes a region 105a for displaying the current rendering hierarchy order of the editing material and an associated control, such as a confirmation control 105b.

In the region 105a, each editing material segment corresponds to a display region, and in the display region one or more items selected from a group comprising the thumbnail image, the name, and the category information of the corresponding editing material segment can be displayed to the user. In addition, in the region 105a, the identifiers respectively corresponding to these editing material segments are sequentially arranged according to the rendering hierarchy from high to low.

For example, as illustrated in FIG. 2B, the region 105a includes display regions respectively corresponding to the sticker segments 1 to 3, for displaying thumbnail images corresponding to the sticker segments 1 to 3, respectively.

It should be noted that the display style adopted for the identifier of each editing material segment can be set flexibly and is not limited to the manner shown in FIG. 2B.

In order to help the user quickly understand the relationship between the identifiers of respective editing material segments in the region 105a and the sorting of the rendering hierarchies, guidance information may be displayed in the region 105a. For example, the textual content "top" is displayed in the region 105c, the textual content "bottom" is displayed in the region 105d. In some cases, in the region 105a, the sorting of the initial rendering hierarchies of the respective editing material segments may also be illustrated by an arrow in combination with a text, or may be implemented in any other way, which is not limited in the present disclosure.

The user can adjust the display position of an editing material segment in the rendering hierarchy adjustment panel by dragging the identifier corresponding to the editing material segment.

Figure 2C:
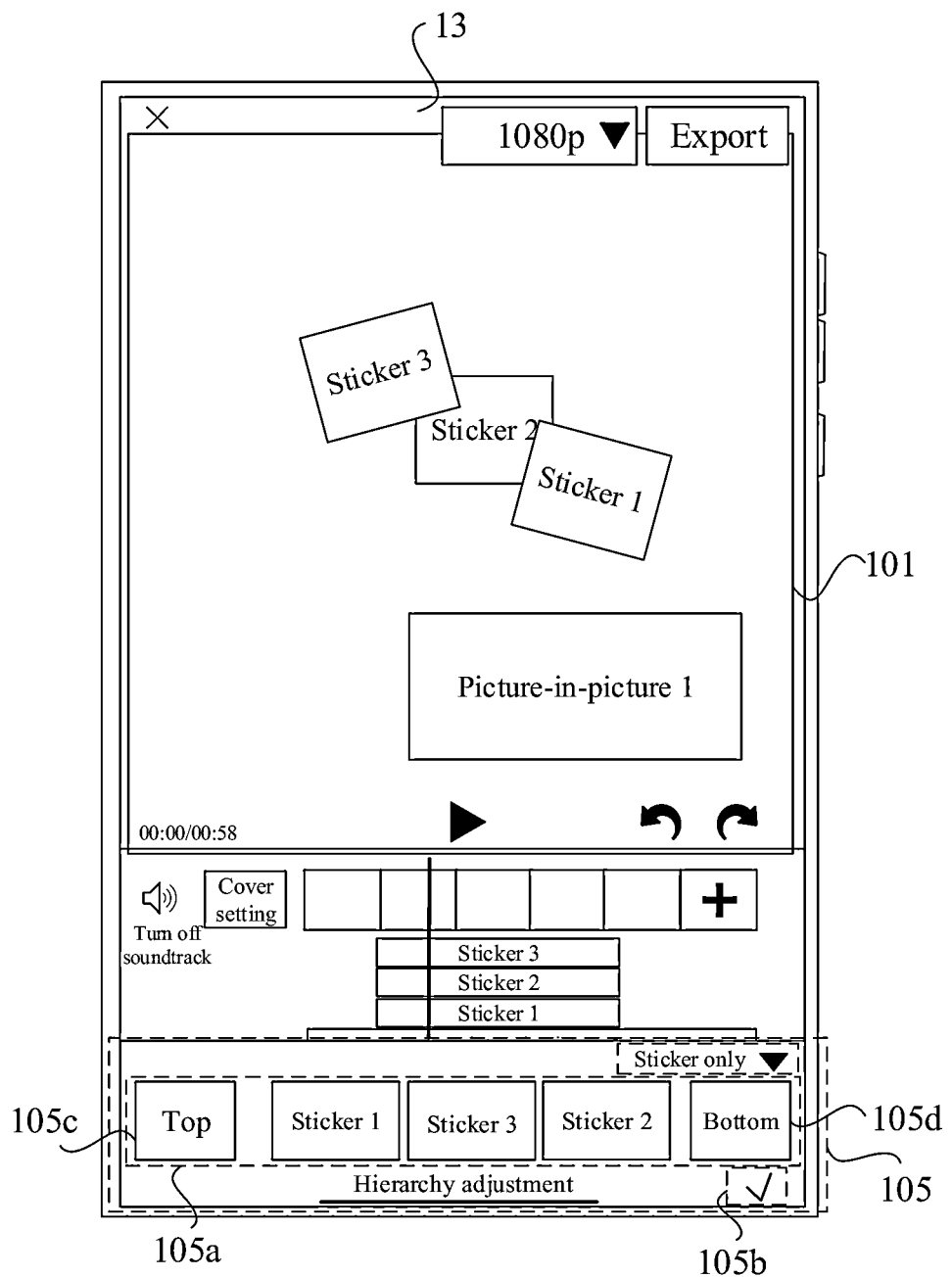

Exemplarily, on the basis of the embodiment illustrated in FIG. 2B, assuming that the user drags the identifier corresponding to the sticker segment 2 to the right side of the identifier of the sticker segment 3, the application 1 may exemplarily display on the mobile phone the user interface 13 illustrated in FIG. 2C. The sticker segment 2 is the editing material segment on which the moving operation mentioned above is performed. In the user interface 13, the display positions of the identifiers corresponding to the sticker segment 2 and the sticker segment 3, respectively, have changed, correspondingly, the rendering hierarchy order of the sticker segment 2 and the sticker segment 3 is adjusted from the sticker segment 2 being higher than the sticker segment 3 to the sticker segment 3 being higher than the sticker segment 2. The rendering hierarchy of the sticker segment 1 is higher than that of the sticker segment 2 and the sticker segment 3 and remains unchanged.

On the basis of the embodiment illustrated in FIG. 2C, the application 1 may render and display in the region 101 according to the adjusted rendering hierarchy order of the sticker segments 1 to 3, the rendering hierarchy order of the picture-in-picture, and the video frame at the current preview position, for the user to preview the editing effect.

Figure 2D:
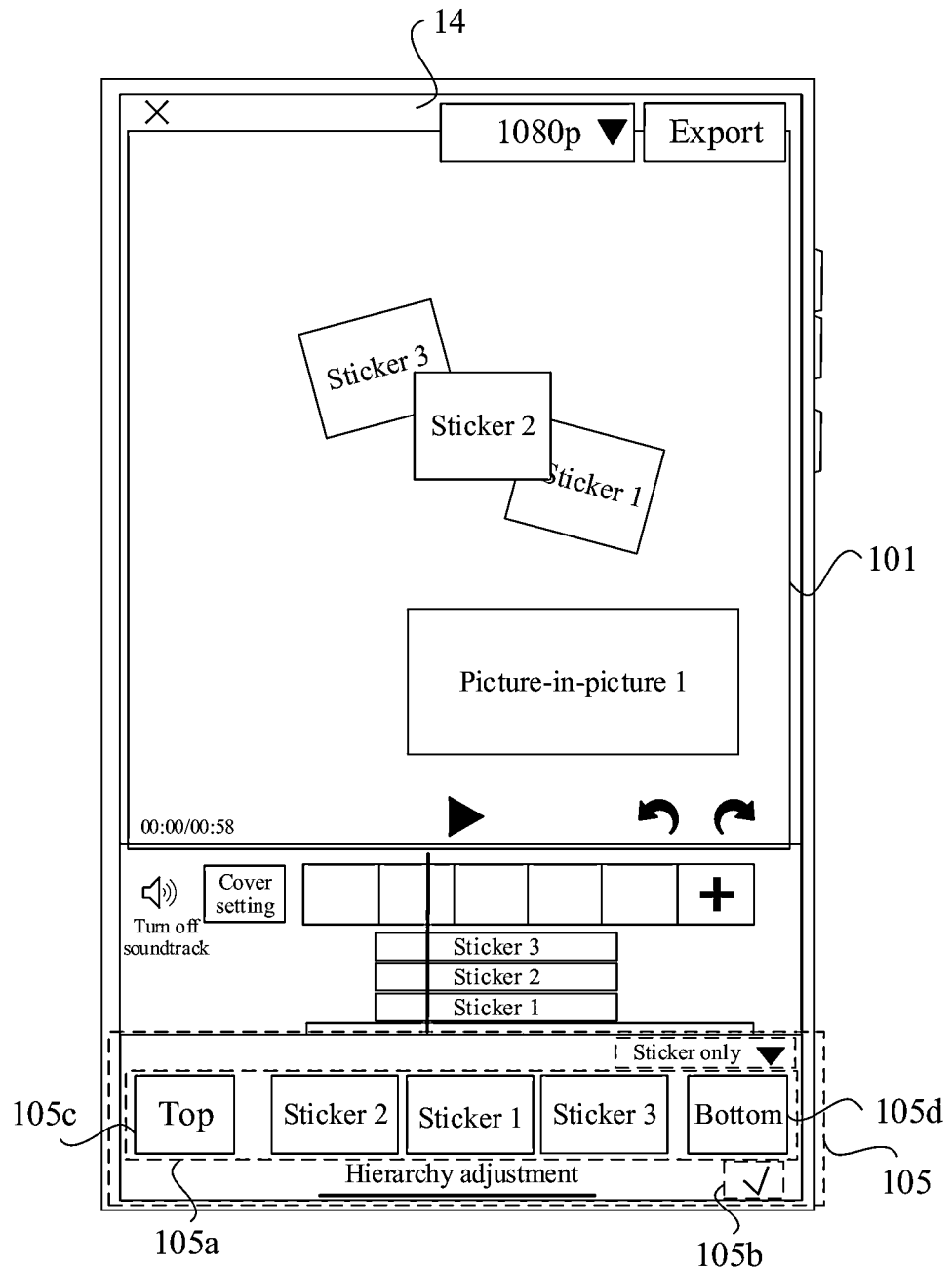

Exemplarily, on the basis of the embodiment illustrated in FIG. 2B, assuming that the user drags the identifier corresponding to the sticker segment 2 to the left side of the identifier of the sticker segment 1, the application 1 may exemplarily display on the mobile phone the user interface 14 illustrated in FIG. 2D. The sticker segment 2 is the editing material segment on which the moving operation mentioned above is performed. In the user interface 14, the positions of the identifiers corresponding to the sticker segment 1 and the sticker segment 2, respectively, have changed, correspondingly, the rendering hierarchy order of the sticker segment 1 and the sticker segment 2 is adjusted from the sticker segment 1 being higher than the sticker segment 2 to the sticker segment 2 being higher than the sticker segment 1. The rendering hierarchy of the sticker segment 3 is lower than that of the sticker segment 1 and the sticker segment 2 and remains unchanged.

On the basis of the embodiment illustrated in FIG. 2D, the application 1 may render and display in the region 101 in real time according to the adjusted rendering hierarchy order of the sticker segments 1 to 3, the rendering hierarchy order of the picture-in-picture, and the video frame image at the current preview position, for the user to preview the editing effect.

Assuming that when the rendering hierarchy order is not adjusted, the sticker fragment 1 obscures part of the region of the sticker fragment 2, the sticker fragment 2 obscures part of the region of the sticker fragment 3, and there is no overlapping region between the sticker fragment 1 and the sticker fragment 3. After adjusting the rendering hierarchy order in accordance with each of the two examples as described above, as in the region 101 of the user interface 13 illustrated in FIG. 2C, the sticker fragment 3 is located on the upper layer of the sticker fragment 2 and displayed, that is, the sticker fragment 3 obscures part of the region of the sticker fragment 2; and in the region 101 of the user interface 14 illustrated in FIG. 2D, the sticker fragment 2 is located on the upper layer of the sticker fragment 1 and displayed, that is, the sticker fragment 2 obscures part of the region of the sticker fragment 1.

Combined with the editing effect illustrated in region 101 of the embodiment illustrated in FIG. 2C and the editing effect illustrated in region 101 of the embodiment illustrated FIG. 2D, the occlusion relationship between the plurality of sticker segments changes after adjusting the rendering hierarchy order of the sticker segments 1 to 3.

In some cases, the user may adjust the positions of the display regions corresponding to the sticker segments 1 to 3, respectively, in the region 105a a plurality of times, thereby adjusting the rendering hierarchy order of the sticker segments 1 to 3, and after each adjustment, the respective editing material segments are rendered and displayed in accordance with the adjusted rendering hierarchy order of the respective editing material segments for the user to preview the editing effect until the desired visual effect is satisfied.

If the user determines that the current editing effect meets the expectation, the user may input a second instruction by operating the confirmation control 105b. The application 1 responds to the second instruction, and determines a target rendering hierarchy order of the plurality of editing material segments described above according to the target order of the identifiers of the plurality of editing material segments.

In some embodiments, the application 1 supports the user to switch from adjusting a rendering hierarchy order of the editing material segments of a single module to adjusting a rendering hierarchy order of the editing material segments of all categories in the rendering hierarchy adjustment panel.

Exemplarily, the application 1 may present the user with an entrance for accessing the category switching panel in the rendering hierarchy adjustment panel. As illustrated in FIG. 2B, the region 104 further includes an entrance 106.

Figure 2E:
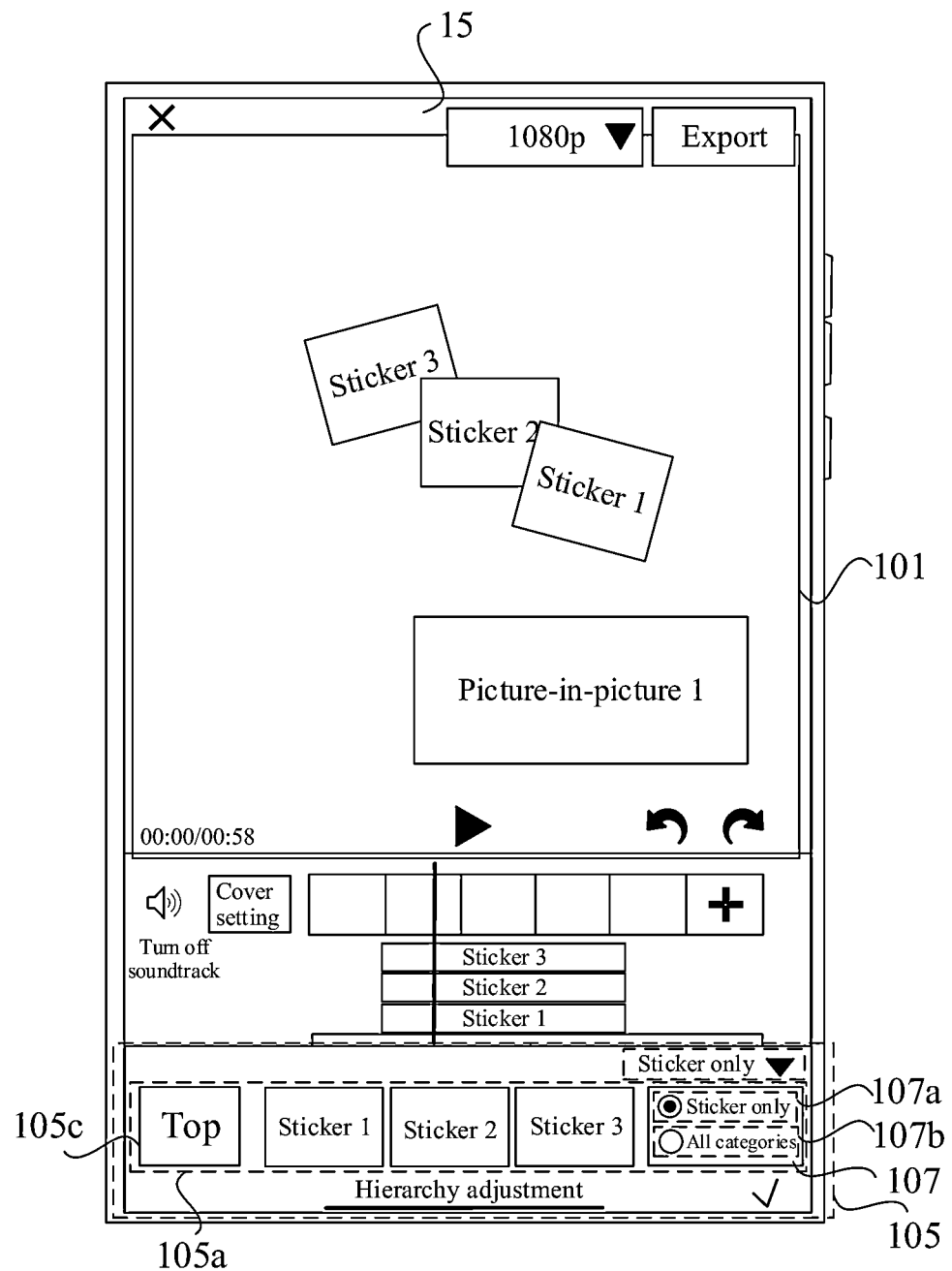

The application 1 responds to a triggered operation (e.g., a click operation) on the entrance 106 by the user, and the application 1 may exemplarily display a user interface 15 as illustrated in FIG. 2E on the mobile phone. The user interface 15 includes a pop-up window 107, the pop-up window 107 may include a plurality of configuration items, each of which corresponds to a category configuration, and the user may switch to display the editing materials of a single module or the editing materials of all categories in the region 105a by operating these configuration items.

The pop-up window 107 includes a configuration item 107a and a configuration item 107b, the configuration item 107a corresponds to a single module, and the configuration item 107b corresponds to all categories. The names of the configuration item 107a and the configuration item 107b may be set according to the actual situation; for example, the name of the configuration item 107a may be "xx only", with "xx" denoting the single module; the name of the configuration item 107b may be "All categories".

In combination with the embodiment illustrated in FIG. 2A above, the entrance 104 is located in the editing tool panel corresponding to the sticker, therefore, editing material segments of the single module corresponding to the configuration item 107a is in the category of the sticker, and the name of the configuration item 107a is "Sticker only" and is positioned to the configuration item 107a by default; the name of the configuration item 107b is "All categories".

It should be noted that if the identifiers of editing material segments of all categories are displayed by default when accessing the rendering hierarchy adjustment panel through the entrance 104, then when entering the pop-up window 107, the pop-up window 107 can be positioned to the configuration item 107b by default.

In addition, the embodiment illustrated in FIG. 2E exemplarily illustrates a case in which two configuration items are included in the pop-up window 107, and in some embodiments, more configuration items may be included in the pop-up window 107. For example, if the current preview position corresponds to the editing material segments of three categories, four configuration items can be displayed in the pop-up window 107, three of the four configuration items are single-module configuration items, and the other one configuration item is an all-categories configuration item.

Figure 2F:
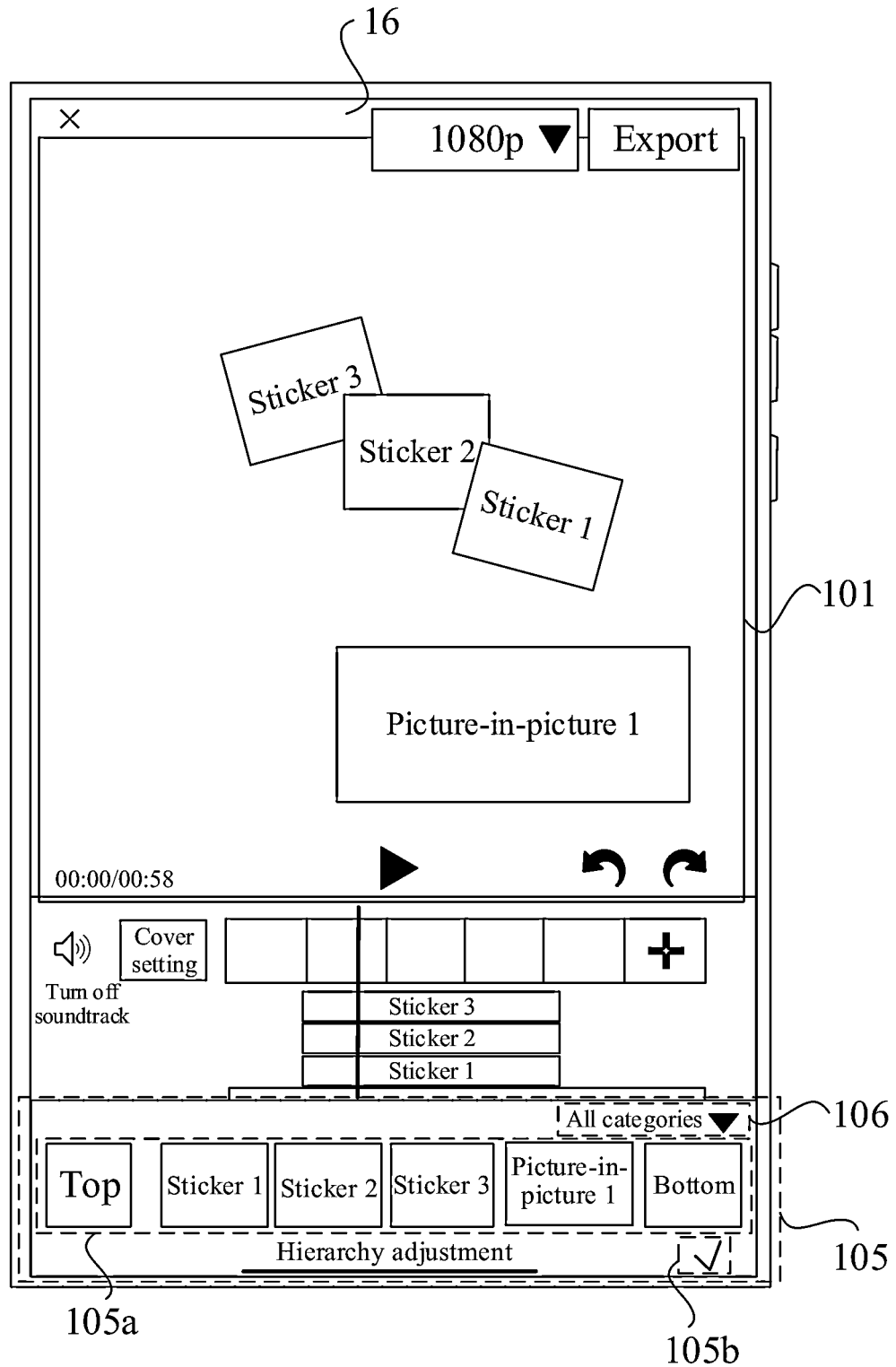

Referring to the embodiment illustrated in FIG. 2E, the application 1 receives the triggered operation on the configuration item 107b and the triggered operation on the entrance 106 by the user, and the application 1 may exemplarily display the user interface 16 as illustrated in FIG. 2F on the mobile phone.

The region 105a in the user interface 16 includes display regions corresponding to the sticker segments 1 to 3 and the picture-in-picture 1, respectively, and the identifiers respectively corresponding to the four editing material segments are arranged in order from left to right according to the current rendering hierarchy order from high to low.

In some embodiments, the video frame at the current preview position may correspond to a greater number of editing material segments, the size of the screen of the mobile phone is limited, and the identifiers corresponding to some editing materials may be displayed on the screen of the mobile phone, and the user may view the identifiers corresponding to more editing material segments by swiping to the left or swiping to the right.

In some embodiments, after the user adjusts the rendering hierarchy order of the editing materials of a single module by the method illustrated in FIG. 2C or FIG. 2D, the user may also access the pop-up window 107 through the entrance 106 in the corresponding panel, and an identifier of an editing material segment of what category, which is displayed in the region 105a, is switched through the configuration item shown in the pop-up window 107.

In some embodiments, the user may enter the pop-up window 107 through the entrance 106 a plurality times and repeatedly switch between the configuration item 107a and the configuration item 107b, so that the identifiers of the editing material segments of different categories are switched to display in the region 105a following the user's operation to meet the user's needs.

The user can control the closing of the pop-up window 107 by triggering to click on any region other than the pop-up window 107 or by clicking on the entrance 106 again.

Combined with the embodiments illustrated in FIG. 2A to FIG. 2F above, the user can achieve the adjustment of the rendering hierarchy order of the editing material segments of the identical category as well as the adjustment of the rendering hierarchy order of the editing material segments of different categories, which breaks the limitation of the fixed sorting of the rendering hierarchy order, thereby satisfying the user's editing needs. For example, the user can move the picture-in-picture above the sticker and the text for display, and can achieve the interspersed editing of video frames at different positions, which greatly enriches the visual effect of the video obtained by editing.

The logic used to perform the rendering hierarchy order adjustment in the adjustment method for the rendering hierarchy order provided in the present disclosure is described in detail below by some embodiments in conjunction with the drawings. There are two situations, one is the rendering hierarchy order adjustment for the editing material segments of a single module, and the other is the rendering hierarchy order adjustment for the editing material segments of all categories.

I. Single Module (Rendering Hierarchy Order Adjustment for the Editing Material Segment of the Specified Category)

The logic of the rendering hierarchy order adjustment for the editing material segments of a single module satisfies the following scenarios:

Scenario 1, for the editing material segment on which the moving operation is performed, after adjustment, if there is an editing material segment of the identical category with the editing material segment on which the moving operation is performed on the previous hierarchy of the editing material segment on which the moving operation is performed, the editing material segment on which the moving operation is performed immediately follows the previous editing material segment of the identical category.

Scenario 2, for the editing material segment on which the moving operation is performed, after adjustment, if there is no editing material segment of the identical category with the editing material segment on which the moving operation is performed on the previous hierarchy of the editing material segment on which the moving operation is performed, the editing material segment on which the moving operation is performed immediately follows the next editing material segment of the identical category.

Scenario 3, for the editing material segment on which the moving operation is performed, after adjustment, if the rendering hierarchy order of each editing material segment of the single module does not change, the rendering hierarchy order of each editing material segment is not adjusted.

Exemplarily, assuming that the video frame at the current preview position corresponds to seven editing material segments, each editing material segment is identified by a rectangle, and the length of which may also indicate a time interval covered by the editing material segment on the video editing timeline track. The three quadrilateral identifiers filled with black are identifiers of editing material segments of the identical category, and are named A, B, and C, respectively, and there exists an editing material segment of other category on the previous hierarchy of the editing material segment A, there exists an editing material segment of other category between the editing material segment A and the editing material segment B, there exists an editing material segment of other category between the editing material segment B and the editing material segment C, and there exists an editing material segment of other category on the next hierarchy of the editing material segment C. The seven editing material segments are arranged from top to bottom according to the rendering hierarchy order from high to low. The vertical black bold solid line in the figure below indicates the current preview position (i.e., the target moment position).

Figure 3A:
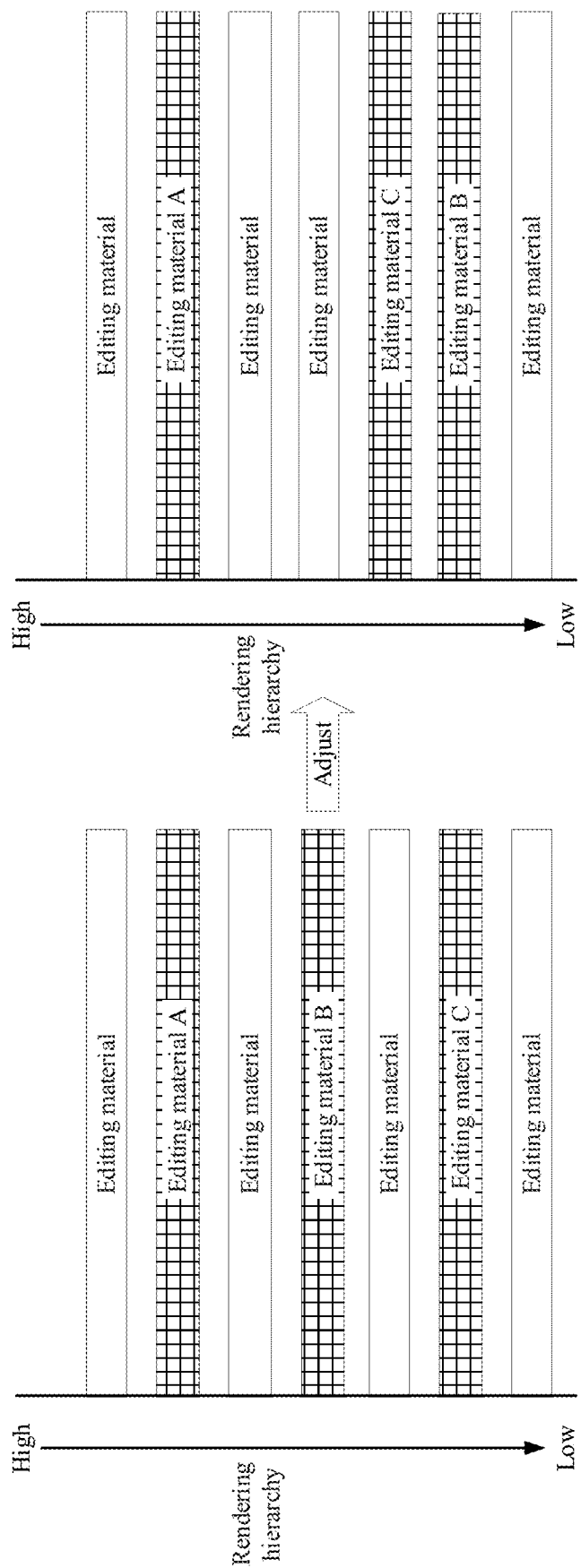

In the scenario of single-module adjustment, assuming that after adjustment, the rendering hierarchy of the editing material segment B is lower than the rendering hierarchy of the editing material segment C, and the rendering hierarchy of the editing material segment A remains unchanged, then referring to the embodiment illustrated in FIG. 3A, the rendering hierarchy order may be updated from the order illustrated on the left side in FIG. 3A to the order illustrated on the right side, and in conjunction with the description of the above scenario 1, after adjustment, there exists an editing material segment C of the identical category on the previous hierarchy of the editing material segment B, then the rendering hierarchy of the editing material segment B can immediately follow the rendering hierarchy of the editing material segment C, that is, after adjustment, the rendering hierarchy of the editing material segment C is 4 and the rendering hierarchy of the editing material segment B is 5.

Figure 3B:
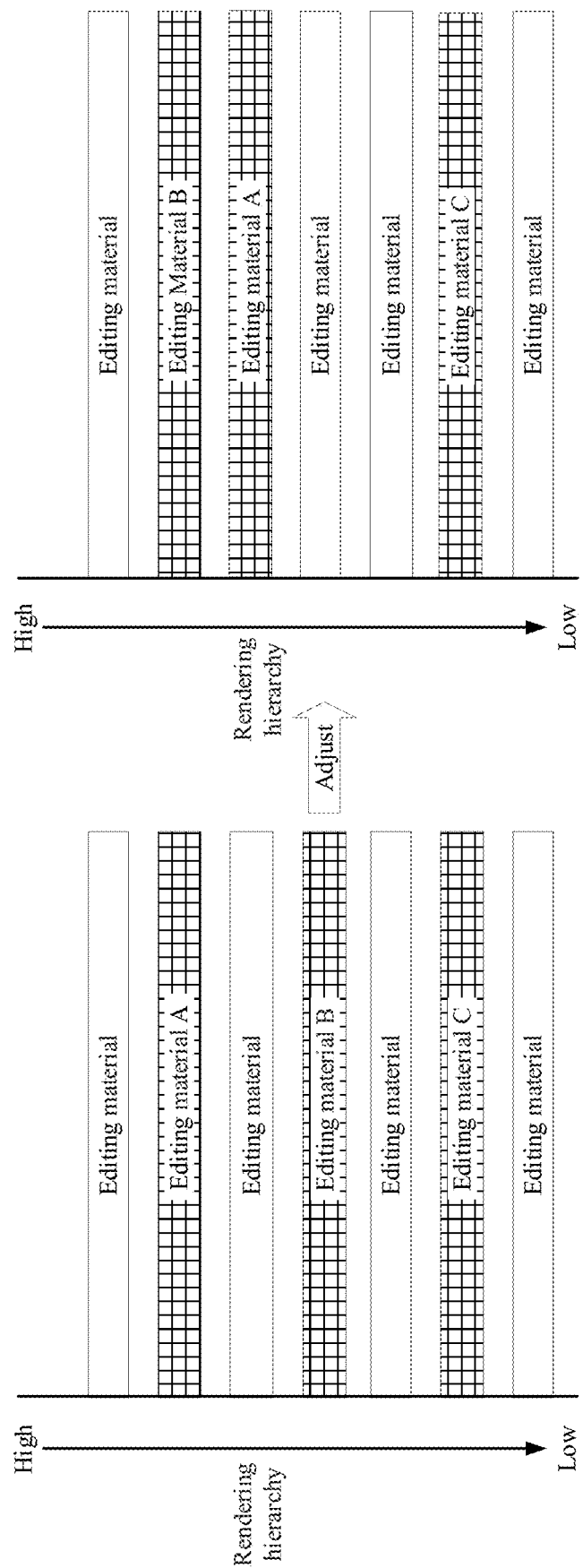

In the scenario of single-module adjustment, assuming that after adjustment, the rendering hierarchy of the editing material segment B is higher than the rendering hierarchy of the editing material segment A, and the rendering hierarchy of the editing material segment C remains unchanged, and then, referring to the embodiment illustrated in FIG. 3B, the rendering hierarchy order may be updated from the order illustrated on the left side in FIG. 3B to the order illustrated on the right side, and in conjunction with the description of the above scenario 2, after adjustment, there is no editing material segment of the identical category on the previous hierarchy of the editing material segment B, then the rendering hierarchy of the editing material segment B can immediately follow the rendering hierarchy of the editing material segment A, that is, after adjustment, the rendering hierarchy of the editing material segment B is 2 and the rendering hierarchy of the editing material segment A is 3.

Figure 3C:
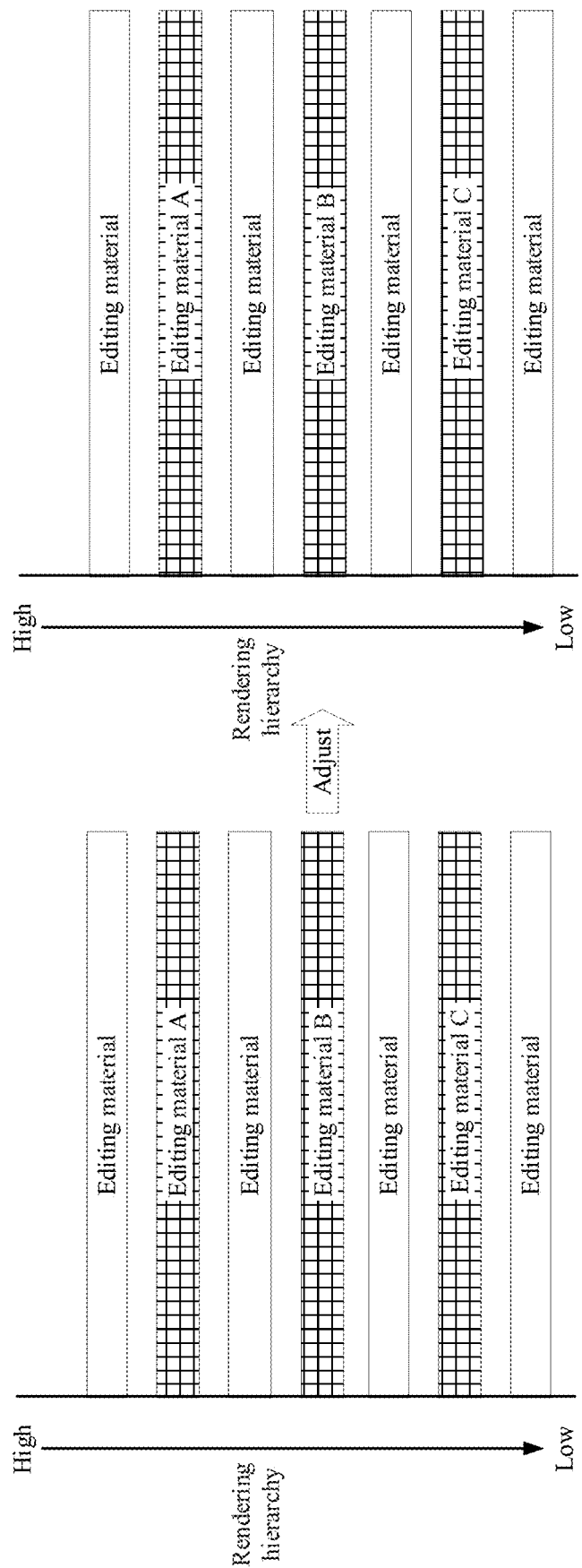

In the scenario of single-module adjustment, assuming that after adjustment, the rendering hierarchy order of the editing material segments A, B, and C remains unchanged, and then, referring to the embodiment illustrated in FIG. 3C, the rendering hierarchy order of the seven editing material segments before the adjustment is consistent with the rendering hierarchy order of the seven editing material segments after the adjustment and the rendering hierarchy order of the seven editing material segments remains unchanged.

II. All Categories

In the scenario of all-categories adjustment, the identifiers of a plurality of editing material segments whose time intervals on the video editing timeline track cover the current preview position are arranged sequentially in the descending order in accordance with the rendering hierarchy order, the editing material segment on which the moving operation is performed can be inserted into the position that is to be adjusted, and the overall upward or downward adjustment of the rendering hierarchy order of the other related editing material segments can be performed.

The logic of the rendering hierarchy order adjustment for the editing material segments of a single module and of all categories as illustrated in the foregoing can be understood to be explained from a local perspective. To make it clearer, the logic of the rendering hierarchy order adjustment for the editing material segments is hereinafter described from a global perspective through the embodiments illustrated in FIG. 3D to FIG. 3F.

Specifically, when adding an editing material segment into the editing project, each editing material segment corresponds to a global track hierarchy position, the global track hierarchy position is the track hierarchy position corresponding to the rendering hierarchy.

Adjusting the hierarchy of the editing material segment can be processed in the following way:

Scenario a, if the category of the editing material segment existing on the target track to be adjusted to is consistent with the category of the editing material segment on which the moving operation is performed, and there is a position for placing an editing material segment, the editing material segment on which the moving operation is performed is placed on the target track.

Scenario b, if the category of the editing material segment existing on the target track to be adjusted to (which is referred to as a current track) is consistent with the category of the editing material segment on which the moving operation is performed, but there is no position for placing an editing material segment, the editing material segment on which the move operation is performed is placed on the upper-layer track of the current track if the upper-layer track of the current track is a track corresponding to a category that is the same as the category of the editing material segment on which the move operation is performed, or else a new track is created above the current track as the target track for placing the editing material segment on which the move operation is performed.

Scenario c, if the category of the editing material segment existing on the target track to be adjusted to (which is referred to as a current track) is not consistent with the category of the editing material segment on which the moving operation is performed, the editing material segment on which the move operation is performed is placed on the upper-layer track of the current track if the upper-layer track of the current track is a track corresponding to a category that is the same as the category of the editing material segment on which the move operation is performed, or else a new track is created above the current track as the target track for placing the editing material segment on which the move operation is performed.

Scenario d, after adjusting the hierarchy, if there is no other editing material on the target track to be adjusted to, a new track is directly created and used as the target track for placing the editing material segment on which the moving operation is performed.

For example, from a global perspective, when an editing project includes a plurality of editing material segments, each editing material segment corresponds to a global hierarchy track position, and the rendering hierarchies corresponding to the global hierarchy tracks decreases in order from top to bottom. A plurality of editing material segments may exist in some tracks, and the plurality of editing material segments on the identical track do not conflict with each other.

Figure 3D:
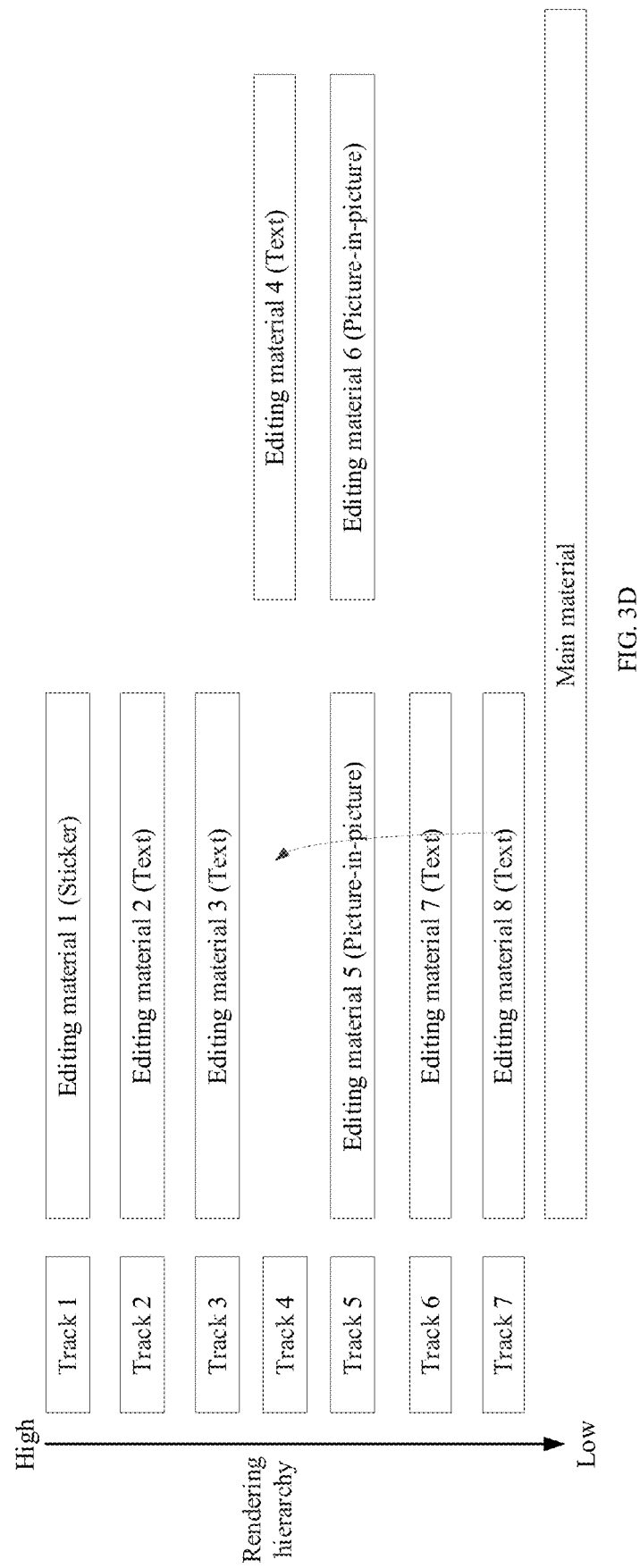
Figure 3E:
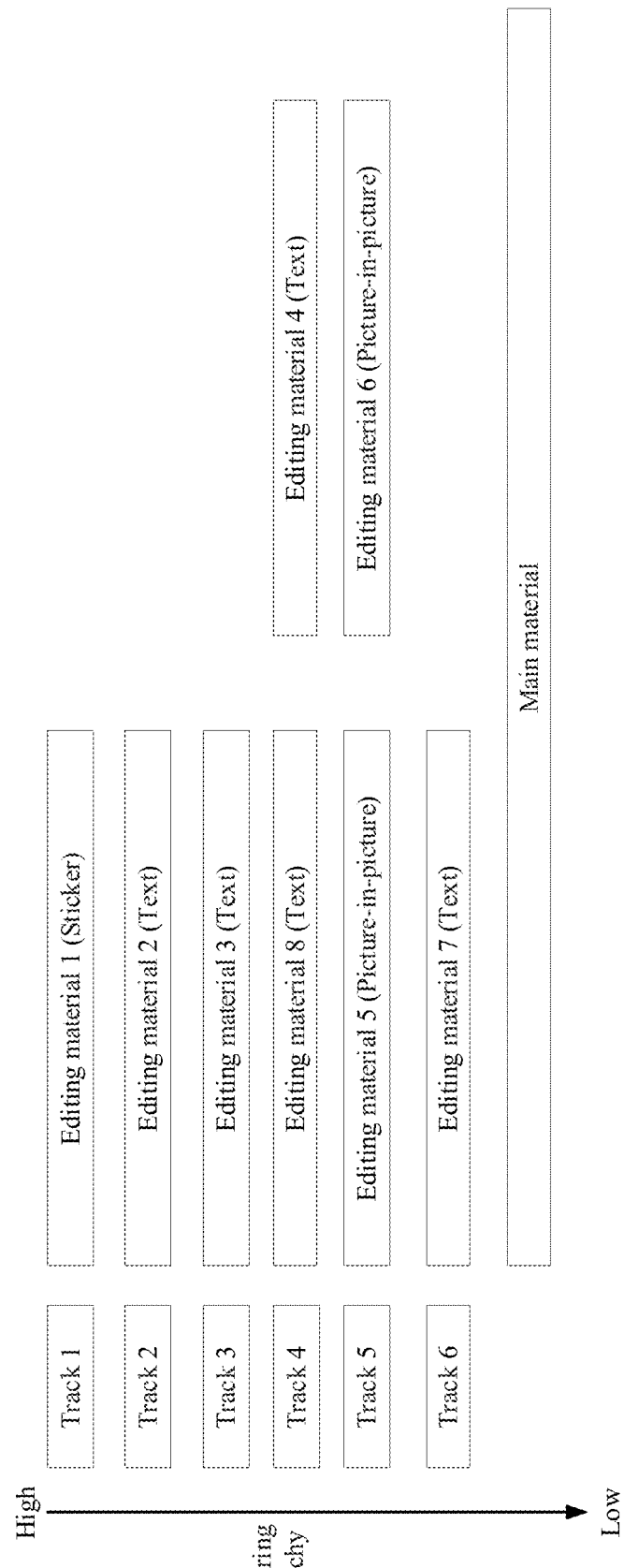

For example, as illustrated in FIG. 3D, it is assumed that the user adds 8 editing material segments, and the 8 editing material segments correspond to 7 tracks, and two editing material segments exist on the track 4. Assuming that the user wants to adjust the rendering hierarchy order of the editing material segment 8 from the current track 7 to the position of the track 4, because the editing material segment category of the editing material segment 8 and the editing material segment category of the editing material segment 4 are identical, and there is a position in the track 4 for placing the editing material segment 8, the editing material segment 8 can be adjusted to the track 4, that is, as illustrated in FIG. 3E, thereby adjusting the rendering hierarchy order of the editing material segment 8 to the rendering hierarchy order corresponding to the track 4. That is, it corresponds to the processing way illustrated in the scenario a.

Figure 3F:
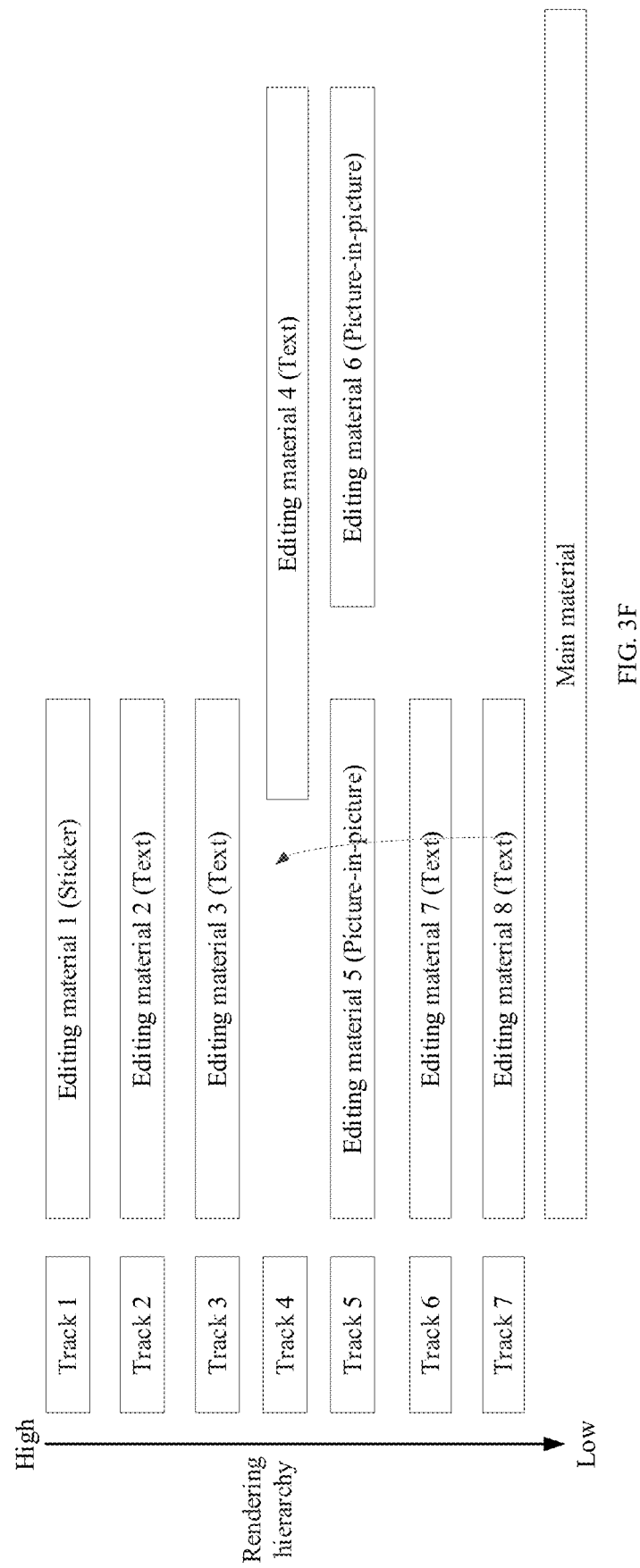
Figure 3G:
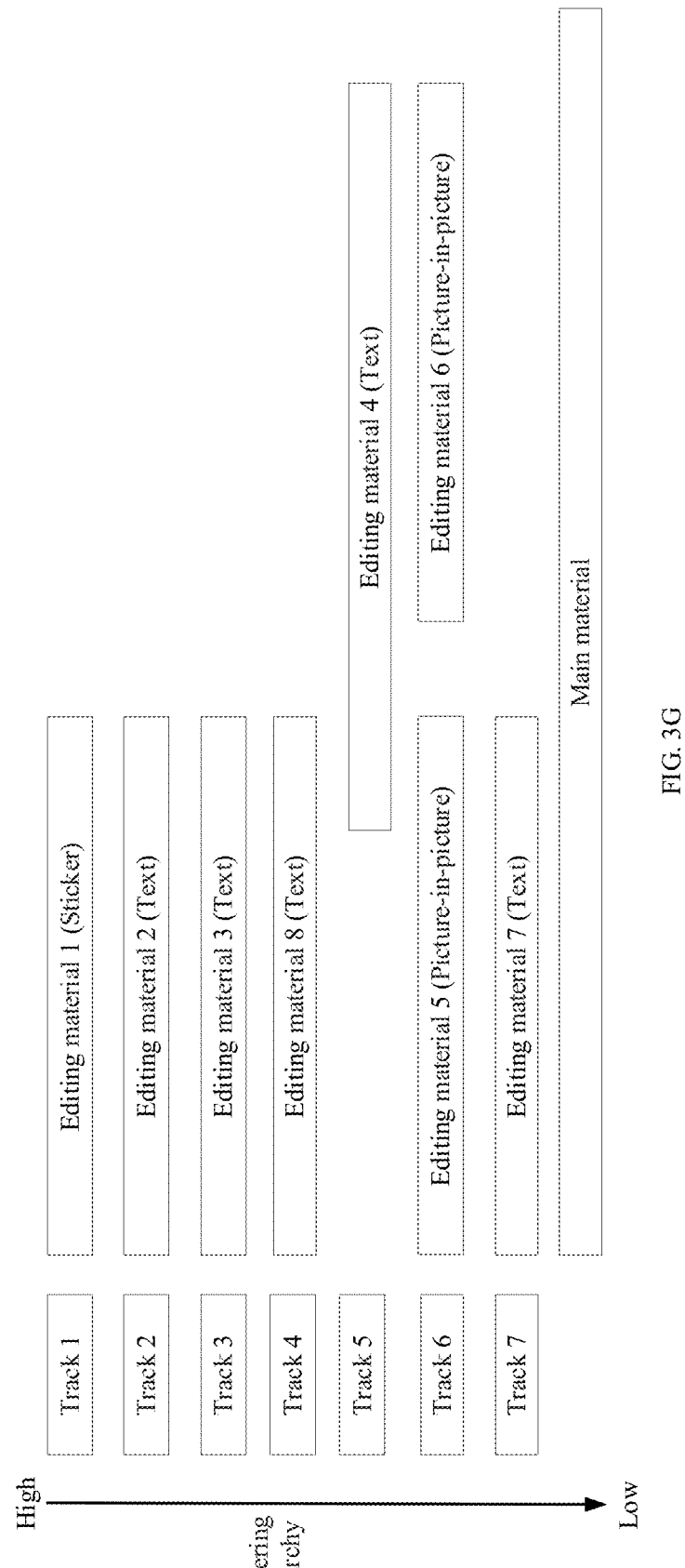

For example, as illustrated in FIG. 3F, assuming that the user adds 8 editing material segments, and wants to adjust the rendering hierarchy order of the editing material segment 8 from the current track 7 to the position of the track 4, because the editing material segment category of the editing material segment 8 and the editing material segment category of the editing material segment 4 are identical, but there is no position in the track 4 for placing the editing material segment 8 (i.e., there is a conflict when the editing material segment 8 and the editing material segment 4 are located in the track 4 at the same time), therefore, a new track 4 may be created for placing the editing material segment 8, that is, as illustrated in FIG. 3G, thereby adjusting the rendering hierarchy order of the editing material segment 8 to the rendering hierarchy order corresponding to the track 4. That is, it corresponds to the processing way illustrated in the scenario b.

It should be noted that, with reference to FIG. 3G, the tracks corresponding to the editing material segment 4 to the editing material segment 7, respectively, are sequentially shifted downward, and accordingly, the rendering hierarchies of the editing material segments 4 to 7 are overall lowered.

Figure 3H:
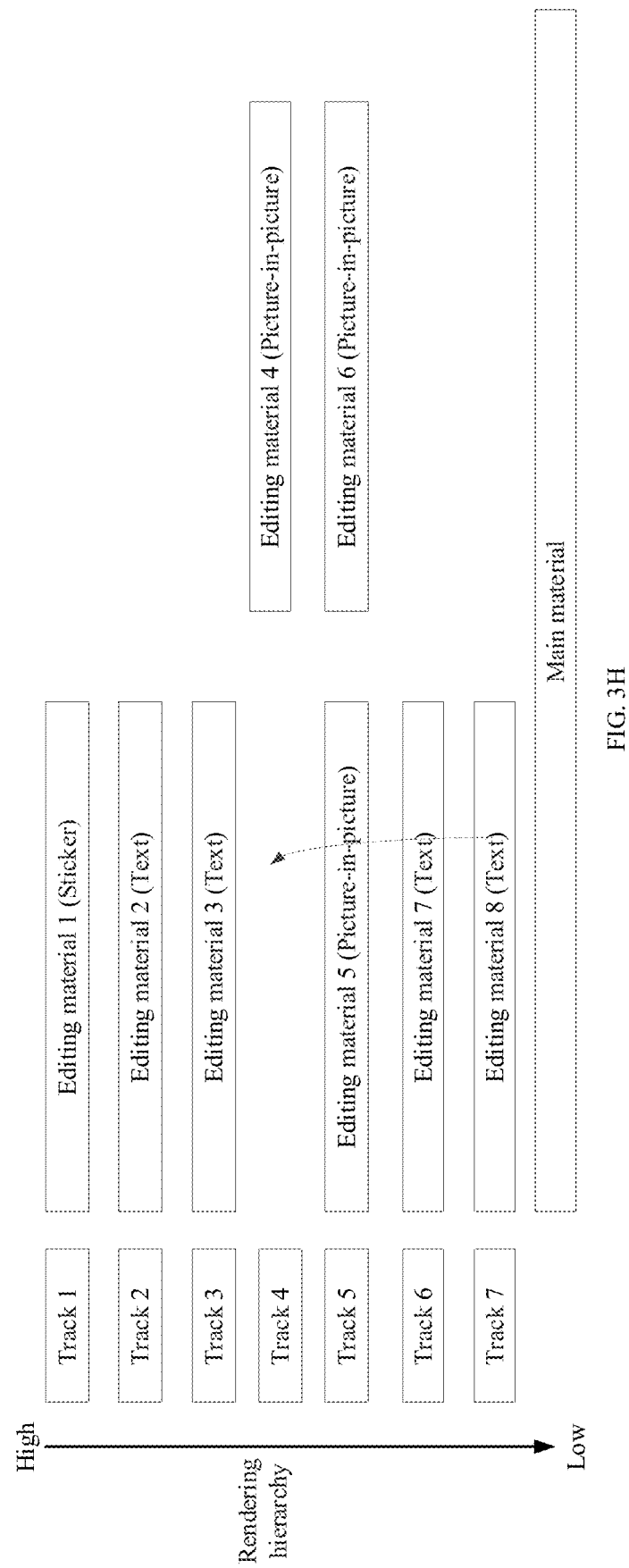
Figure 3I:
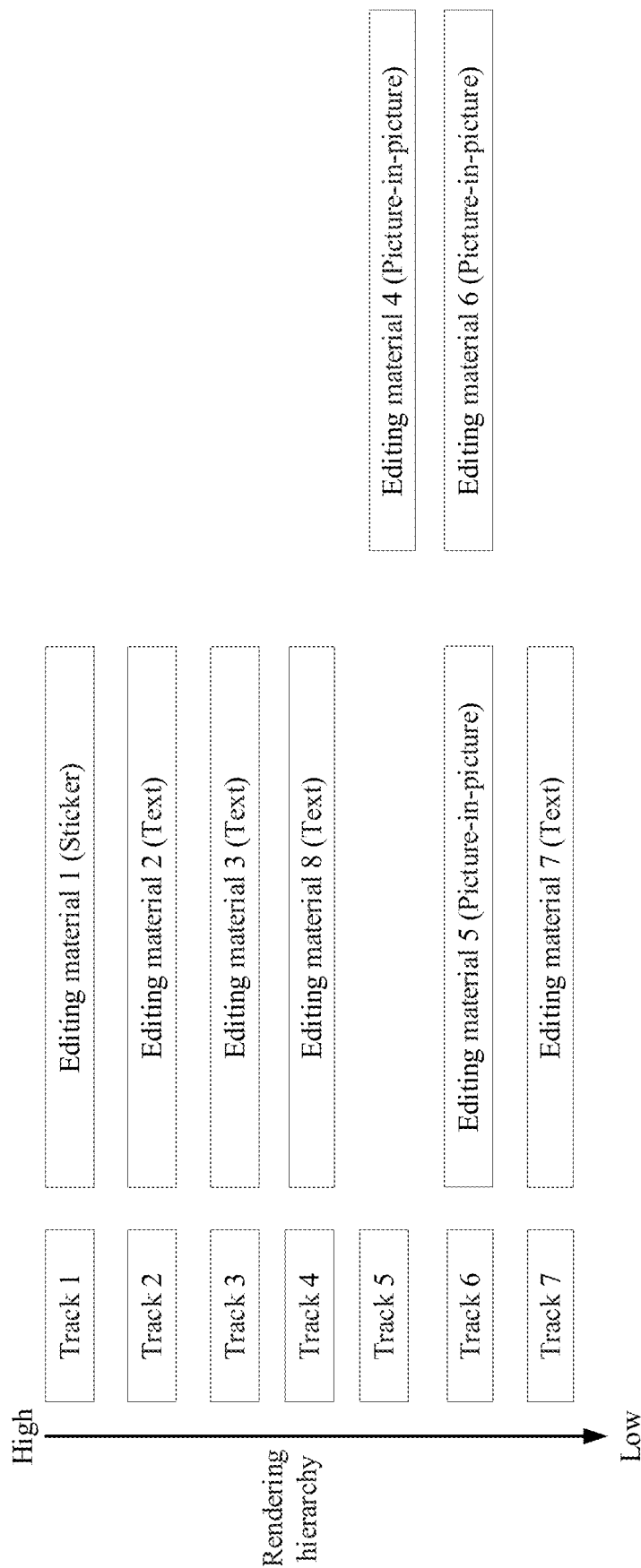

For example, as illustrated in FIG. 3H, assuming that the user adds 8 editing material segments and wants to adjust the rendering hierarchy order of the editing material segment 8 from the current track 7 to the position of the track 4, because the editing material segment category of the editing material segment 8 and the editing material segment category of the editing material segment 4 are not identical, a new track 4 may be created for placing the editing material segment 8, that is, as illustrated in FIG. 3I, thereby adjusting the rendering hierarchy order of the editing material segment 8 to the rendering hierarchy order corresponding to the track 4. That is, it corresponds to the processing way illustrated in the scenario c.

It should be noted that, with reference to FIG. 3I, the tracks corresponding to the editing material segment 4 to the editing material segment 7, respectively, are sequentially shifted downward, and accordingly, the rendering hierarchies of the editing material segments 4 to 7 are overall lowered.

Figure 3J:
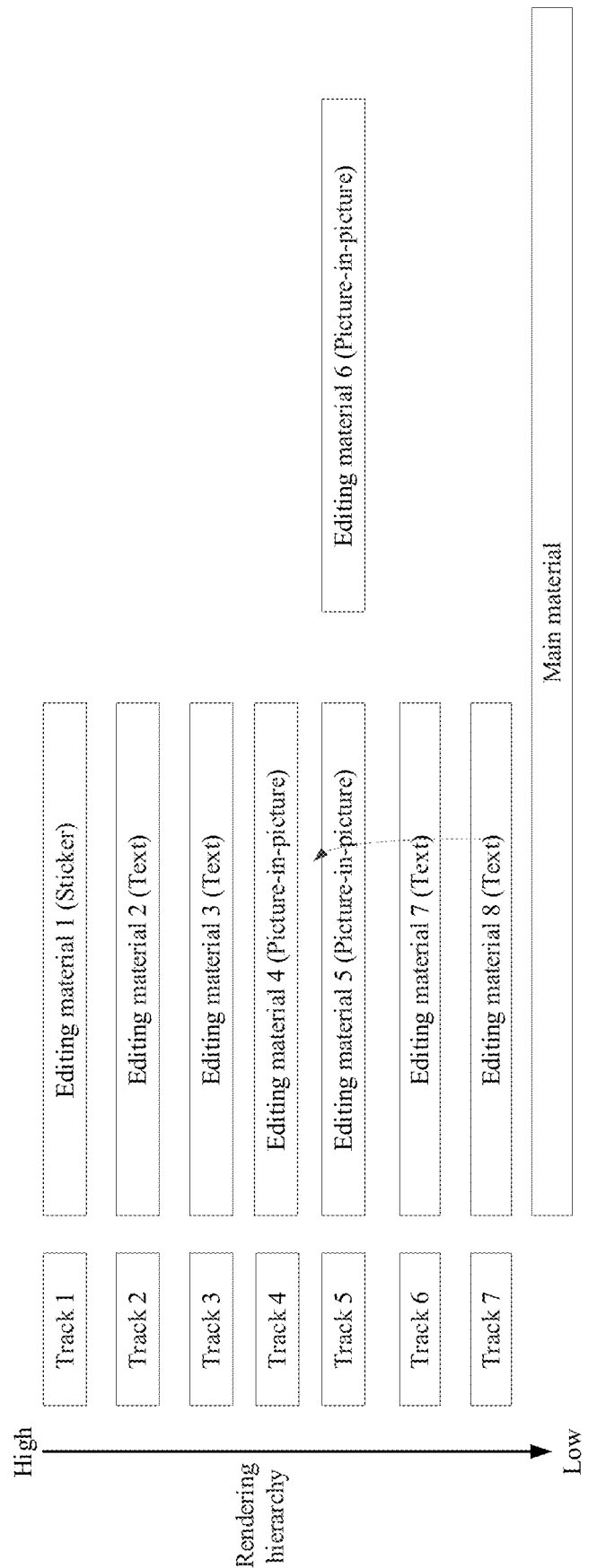

For example, as illustrated in FIG. 3J, assuming that the user adds eight editing material segments and wants to adjust the rendering hierarchy order of the editing material segment 8 from the current track 7 to a position between the track 4 and the track 5, a new track 5 may be created for placing the editing material segment 8, that is, as illustrated in FIG. 3K, thereby adjusting the rendering hierarchy order of the editing material segment 8 to the rendering hierarchy order corresponding to the track 5. That is, it corresponds to the processing way illustrated in the scenario d.

It should be noted that, with reference to FIG. 3K, the tracks corresponding to the editing material segment 4 to the editing material segment 7, respectively, are sequentially shifted downward, and accordingly, the rendering hierarchies of the editing material segments 4 to 7 are overall lowered.

The embodiments illustrated in FIG. 3E to FIG. 3K above are schematic diagrams of the logic of adjusting the rendering hierarchy order of the editing material segment from a global perspective. In the practical application, some editing tools, such as editing tools installed on the PC, may present user interfaces as illustrated in FIG. 3E to FIG. 3K based on the above implementation logic to the user to facilitate the user in understanding the adjustment process of the rendering hierarchy and using the rendering hierarchy adjustment function.

Exemplarily, the present disclosure also provides an adjustment apparatus for a rendering hierarchy order.

Figure 4:
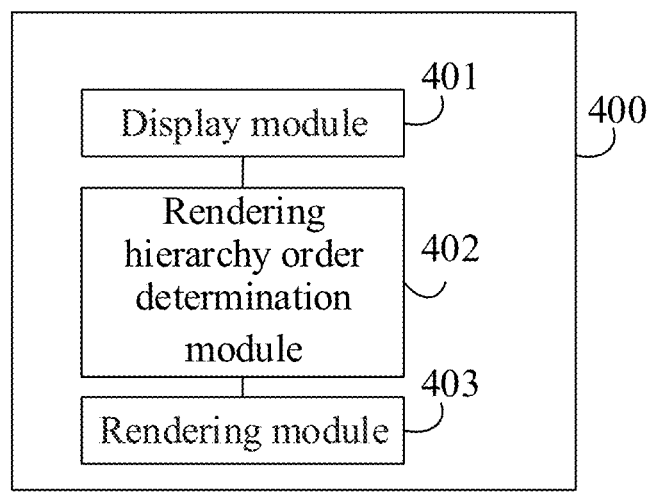
FIG. 4 is a structural schematic diagram of an adjustment apparatus for a rendering hierarchy order provided by an embodiment of the present disclosure.

FIG. 4 is a structural schematic diagram of an adjustment apparatus for a rendering hierarchy order provided by an embodiment of the present disclosure. Referring to FIG. 4, the adjustment apparatus for the rendering hierarchy order 400 provided in the present embodiment includes:

a display module 401 used to display, in response to a first instruction triggered for a target moment position of a video editing timeline track, a rendering hierarchy adjustment panel corresponding to the target moment position; where identifiers of a plurality of editing material segments are displayed in the rendering hierarchy adjustment panel according to an initial order, a time interval covered by the plurality of editing material segments on the video editing timeline track comprises the target moment position, the initial order of the identifiers of the plurality of editing material segments is consistent with an initial rendering hierarchy order of the plurality of editing material segments;

the display module 401 further used to adjust, in response to a moving operation for an identifier of at least one editing material segment of the identifiers of the plurality of editing material segments, a display position of the identifier of the at least one editing material segment in the rendering hierarchy adjustment panel, causing the identifiers of the plurality of editing material segments to be displayed in the rendering hierarchy adjustment panel according to a target order corresponding to the identifiers of the plurality of editing material segments; and a rendering hierarchy order determination module 402 used to determine, in response to a second instruction triggered for the rendering hierarchy adjustment panel, a target rendering hierarchy order of the plurality of editing material segments according to the target order of the identifiers of the plurality of editing material segments.

In some embodiments, the adjustment apparatus for the rendering hierarchy order 400 further include a rendering module 403 used to render, in response to selecting the target moment position on the video editing timeline track as a preview position, images of the plurality of editing material segments at the target moment position according to the initial rendering hierarchy order; and the display module 401 is further used to display the rendered images in a preview region.

The rendering module 403 is further used to render the images of the plurality of editing material segments at the target moment position according to the target rendering hierarchy order after the in response to a second instruction triggered for the rendering hierarchy adjustment panel; and the display module 401 is further used to display the rendered images in the preview region.

In some embodiments, when the first instruction is triggered for an editing material segment of a specified category, then the plurality of editing material segments displayed in the rendering hierarchy adjustment panel are all editing material segments of the specified category.

In some embodiments, the display module 401 is further used to display, in response to a third instruction triggered for the rendering hierarchy adjustment panel, identifiers of editing material segments, whose time intervals covered on the video editing timeline track comprise the target moment position, of all categories in the rendering hierarchy adjustment panel; and adjust, in response to a moving operation for an identifier of at least one editing material segment of identifiers of the editing material segments of all categories, a display position of the identifier of the at least one editing material segment of the identifiers of the editing material segments of all categories in the rendering hierarchy adjustment panel, causing the identifiers of the editing material segments of all categories to be displayed in the rendering hierarchy adjustment panel according to a target order corresponding to the identifiers of the editing material segments of all categories.

The rendering hierarchy order determination module 402 is further used to determine a target rendering hierarchical order of the editing material segments of all categories according to the target order of the identifiers of the editing material segments of all categories.

In some embodiments, the rendering hierarchy order determination module 402 is specifically for determining that: in response to no editing material segment of an identical category with an editing material segment on which the moving operation is performed existing at a higher hierarchy of the editing material segment on which the moving operation is performed, a next hierarchy of a rendering hierarchy corresponding to the editing material segment on which the moving operation is performed is a hierarchy of an editing material segment of the identical category with the editing material segment on which the moving operation is performed; in response to the editing material segment of the identical category with the editing material segment on which the moving operation is performed existing at the higher hierarchy of the editing material segment on which the moving operation is performed, a previous hierarchy of the rendering hierarchy corresponding to the editing material segment on which the moving operation is performed is a hierarchy of the editing material segment of the identical category with the editing material segment on which the moving operation is performed; in response to a rendering hierarchy order of the editing material segment of the specified category before the moving operation is performed being identical to the rendering hierarchy order of the editing material segment of the specified category after the moving operation is performed, a rendering hierarchy order of the plurality of editing material segments in all editing material segments corresponding to the target moment position is not adjusted.

In some embodiments, the identifier of the editing material segment displayed in the rendering hierarchy adjustment panel comprises: a thumbnail image corresponding to the editing material segment and/or a description text of the editing material segment.

In some embodiments, the rendering hierarchy order determination module 402 is further used to, in response to a fourth instruction triggered for the target moment position, create a newly created editing material segment at the target moment position and determine an initial rendering hierarchy corresponding to the newly created editing material segment according to a preset rendering hierarchy order.

In some embodiments, the preset rendering hierarchy order is sequentially, in descending order, a text, a sticker, a filter, an adjustment, and a picture-in-picture; the rendering hierarchy order determination module 402 is specifically used to determine the initial rendering hierarchy corresponding to the newly created editing material segment as follows: in response to the newly created editing material segment being the text, determine that the initial rendering hierarchy of the newly created editing material segment is a highest hierarchy; in response to the newly created editing material segment being the sticker, determine that the initial rendering hierarchy of the newly created editing material segment is lower than a rendering hierarchy of a text editing material segment with a lowest hierarchy; in response to the newly created editing material segment being the filter or the adjustment, determine that the initial rendering hierarchy of the newly created editing material segment is lower than a rendering hierarchy of a sticker editing material segment with a lowest hierarchy; and in response to the newly created editing material segment being the picture-in-picture, determine that the initial rendering hierarchy of the newly created editing material segment is lower than a rendering hierarchy of a filter or adjustment editing material segment with a lowest hierarchy.

The rendering apparatus provided in the present embodiment can be used to perform the technical solutions of any of the above method embodiments, and the implementation principle as well as the technical effect thereof are similar, and reference can be made to the detailed description of the above method embodiments, which will not be repeated herein for the sake of brevity.

Figure 5:
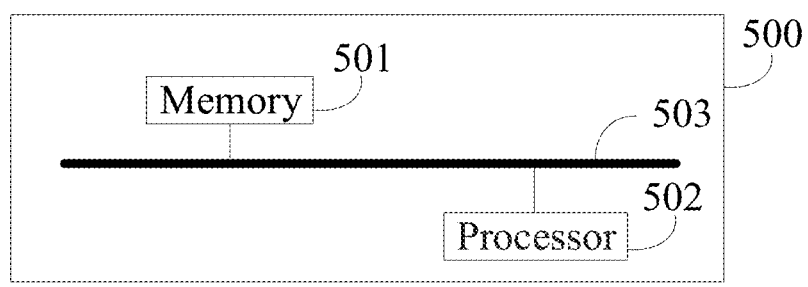
FIG. 5 is a structural schematic diagram of an electronic device according to an embodiment of the present disclosure.

FIG. 5 is a structural schematic diagram of an electronic device according to an embodiment of the present disclosure. Referring to FIG. 5, the electronic device 500 provided in the present embodiment includes a memory 501 and a processor 502.

The memory 501 may be a separate physical unit, and may be connected with the processor 502 via a bus 503. The memory 501 and the processor 502 may also be integrated together, and implemented through a hardware, and the like. The memory 501 is used to store program instructions, and the processor 502 invokes the program instructions to execute the adjustment method for the rendering hierarchy order provided by any of the above method embodiments.

Optionally, when part or all of the method in the above embodiments are implemented through a software, the above electronic device 500 may also include only the processor 502. The memory 501 for storing programs is located outside the electronic device 500, and the processor 502 is connected to the memory through a circuit/wire for reading and executing the programs stored in the memory. The processor 502 may be a central processing unit (CPU), a network processor (NP), or a combination of a CPU and an NP. The processor 502 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 501 may include a volatile memory, such as a random-access memory (RAM); the memory 501 may also include a non-volatile memory, such as a flash memory, a hard disk drive (HDD), or a solid-state drive (SSD); the memory 501 may also include a combination of the above types of memories.

The present disclosure also provides anon-transitory computer-readable storage medium, which includes a computer program instruction, the computer program instruction, upon being executed by at least one processor of an electronic device, cause the electronic device to implement the adjustment method for the rendering hierarchy order provided by any of the above method embodiments.

The present disclosure also provides a computer program product, when the computer program product is run on the computer, the computer is caused to implement the adjustment method for the rendering hierarchy order provided by any of the above method embodiments.

It should be noted that, in the present disclosure, the relational terms such as "first", "second", and the like, are only used to distinguish one entity or operation from another entity or operation, and are not intended to require or imply the existence of any such actual relationship or order between these entities or operations. Furthermore, the terms "comprise/comprising", "include/including", or any other variations thereof are intended to cover a non-exclusive inclusion such that a process, method, article, or device that includes a list of elements includes not only those elements, but also other elements not expressly listed, or elements inherent to the process, method, article, or device. Without further limitation, the fact that an element is limited by the statement "comprises/includes a . . . " does not exclude the presence of additional identical elements in the process, method, article, or device that includes the element.

What have been described above are only specific implementations of the present disclosure, enabling those skilled in the art to understand or implement the present disclosure. Various modifications to these embodiments are apparent to those skilled in the art, and the generic principles defined herein may be implemented in other embodiments without departing from the spirit or scope of the present disclosure. Therefore, the present disclosure is not to be limited to the embodiments described herein but is intended to be accorded the broadest scope consistent with the principles and novel features disclosed herein.

What is claimed is:

1. An adjustment method for a rendering hierarchy order, comprising:
    in response to a first instruction triggered for a target moment position of a video editing timeline track, displaying a rendering hierarchy adjustment panel corresponding to the target moment position; wherein identifiers of a plurality of editing material segments are displayed in the rendering hierarchy adjustment panel according to an initial order, a time interval covered by the plurality of editing material segments on the video editing timeline track comprises the target moment position, the initial order of the identifiers of the plurality of editing material segments is consistent with an initial rendering hierarchy order of the plurality of editing material segments;
    in response to a moving operation for an identifier of at least one editing material segment of the identifiers of the plurality of editing material segments, adjusting a display position of the identifier of the at least one editing material segment in the rendering hierarchy adjustment panel, causing the identifiers of the plurality of editing material segments to be displayed in the rendering hierarchy adjustment panel according to a target order corresponding to the identifiers of the plurality of editing material segments; and
    in response to a second instruction triggered for the rendering hierarchy adjustment panel, determining a target rendering hierarchy order of the plurality of editing material segments according to the target order of the identifiers of the plurality of editing material segments.

2. The adjustment method for the rendering hierarchy order according to claim 1, wherein before the in response to a first instruction triggered for a target moment position of a video editing timeline track, the adjustment method for the rendering hierarchy order further comprises:
    in response to selecting the target moment position on the video editing timeline track as a preview position, rendering images of the plurality of editing material segments at the target moment position according to the initial rendering hierarchy order and displaying the images after being rendered in a preview region;
    after the in response to a second instruction triggered for the rendering hierarchy adjustment panel, the adjustment method for the rendering hierarchy order further comprises: rendering the images of the plurality of editing material segments at the target moment position according to the target rendering hierarchy order and displaying the images after being rendered in the preview region.

3. The adjustment method for the rendering hierarchy order according to claim 2, wherein in response to the first instruction being triggered for an editing material segment of a specified category, the plurality of editing material segments displayed in the rendering hierarchy adjustment panel are all editing material segments of the specified category.

4. The adjustment method for the rendering hierarchy order according to claim 2, further comprising:
    in response to a fourth instruction triggered for the target moment position, creating a newly created editing material segment at the target moment position and determining an initial rendering hierarchy corresponding to the newly created editing material segment according to a preset rendering hierarchy order.

5. The adjustment method for the rendering hierarchy order according to claim 4, wherein the preset rendering hierarchy order is, in descending order, a text, a sticker, a filter, an adjustment, and a picture-in-picture; the determining an initial rendering hierarchy corresponding to the newly created editing material segment according to a preset rendering hierarchy order, comprises:

in response to the newly created editing material segment being the text, determining that the initial rendering hierarchy of the newly created editing material segment is a highest hierarchy;

in response to the newly created editing material segment being the sticker, determining that the initial rendering hierarchy of the newly created editing material segment is lower than a rendering hierarchy of a text editing material segment with a lowest hierarchy;

in response to the newly created editing material segment being the filter or the adjustment, determining that the initial rendering hierarchy of the newly created editing material segment is lower than a rendering hierarchy of a sticker editing material segment with a lowest hierarchy; and in response to the newly created editing material segment being the picture-in-picture, determining that the initial rendering hierarchy of the newly created editing material segment is lower than a rendering hierarchy of a filter or adjustment editing material segment with a lowest hierarchy.

6. The adjustment method for the rendering hierarchy order according to claim 1, wherein in response to the first instruction being triggered for an editing material segment of a specified category, the plurality of editing material segments displayed in the rendering hierarchy adjustment panel are all editing material segments of the specified category.

7. The adjustment method for the rendering hierarchy order according to claim 6, further comprising:

in response to a third instruction triggered for the rendering hierarchy adjustment panel, displaying identifiers of editing material segments, whose time intervals covered on the video editing timeline track comprise the target moment position, of all categories in the rendering hierarchy adjustment panel;

in response to a moving operation for an identifier of at least one editing material segment of the identifiers of the editing material segments of all categories, adjusting a display position of the identifier of the at least one editing material segment of the identifiers in the rendering material segments of all categories in the rendering hierarchy adjustment panel, causing the identifiers of the editing material segments of all categories to be displayed in the rendering hierarchy adjustment panel according to a target order corresponding to the identifiers of the editing material segments of all categories; and determining a target rendering hierarchical order of the editing material segments of all categories according to the target order of the identifiers of the editing material segments of all categories.

8. The adjustment method for the rendering hierarchy order according to claim 7, wherein the determining a target rendering hierarchy order of the plurality of editing material segments according to the target order of the identifiers of the plurality of editing material segments comprises:

in response to no editing material segment of an identical category with an editing material segment on which the moving operation is performed existing at a higher hierarchy of the editing material segment on which the moving operation is performed, determining that a next hierarchy of a rendering hierarchy corresponding to the editing material segment on which the moving operation is performed is a hierarchy of an editing material segment of the identical category with the editing material segment on which the moving operation is performed;

in response to the editing material segment of the identical category with the editing material segment on which the moving operation is performed existing at the higher hierarchy of the editing material segment on which the moving operation is performed, determining that a previous hierarchy of the rendering hierarchy corresponding to the editing material segment on which the moving operation is performed is a hierarchy of an editing material segment of the identical category with the editing material segment on which the moving operation is performed; and in response to a rendering hierarchy order of the editing material segment of the specified category before the moving operation is performed being identical to the rendering hierarchy order of the editing material segment of the specified category after the moving operation is performed, not adjusting a rendering hierarchy order of the plurality of editing material segments in all editing material segments corresponding to the target moment position.

9. The adjustment method for the rendering hierarchy order according to claim 6, wherein the determining a target rendering hierarchy order of the plurality of editing material segments according to the target order of the identifiers of the plurality of editing material segments comprises:

in response to no editing material segment of an identical category with an editing material segment on which the moving operation is performed existing at a higher hierarchy of the editing material segment on which the moving operation is performed, determining that a next hierarchy of a rendering hierarchy corresponding to the editing material segment on which the moving operation is performed is a hierarchy of an editing material segment of the identical category with the editing material segment on which the moving operation is performed;

in response to the editing material segment of the identical category with the editing material segment on which the moving operation is performed existing at the higher hierarchy of the editing material segment on which the moving operation is performed, determining that a previous hierarchy of the rendering hierarchy corresponding to the editing material segment on which the moving operation is performed is a hierarchy of an editing material segment of the identical category with the editing material segment on which the moving operation is performed; and in response to a rendering hierarchy order of the editing material segment of the specified category before the moving operation is performed being identical to the rendering hierarchy order of the editing material segment of the specified category after the moving operation is performed, not adjusting a rendering hierarchy order of the plurality of editing material segments in all editing material segments corresponding to the target moment position.

10. The adjustment method for the rendering hierarchy order according to claim 1, wherein the identifier of the editing material segment displayed in the rendering hierarchy adjustment panel comprises: a thumbnail image corresponding to the editing material segment and/or a description text of the editing material segment.

11. The adjustment method for the rendering hierarchy order according to claim 1, further comprising:

in response to a fourth instruction triggered for the target moment position, creating a newly created editing material segment at the target moment position and determining an initial rendering hierarchy corresponding to the newly created editing material segment according to a preset rendering hierarchy order.

12. The adjustment method for the rendering hierarchy order according to claim 11, wherein the preset rendering hierarchy order is, in descending order, a text, a sticker, a filter, an adjustment, and a picture-in-picture; the determining an initial rendering hierarchy corresponding to the newly created editing material segment according to a preset rendering hierarchy order, comprises:
   in response to the newly created editing material segment being the text, determining that the initial rendering hierarchy of the newly created editing material segment is a highest hierarchy;
   in response to the newly created editing material segment being the sticker, determining that the initial rendering hierarchy of the newly created editing material segment is lower than a rendering hierarchy of a text editing material segment with a lowest hierarchy;
   in response to the newly created editing material segment being the filter or the adjustment, determining that the initial rendering hierarchy of the newly created editing material segment is lower than a rendering hierarchy of a sticker editing material segment with a lowest hierarchy; and
   in response to the newly created editing material segment being the picture-in-picture, determining that the initial rendering hierarchy of the newly created editing material segment is lower than a rendering hierarchy of a filter or adjustment editing material segment with a lowest hierarchy.

13. An electronic device, comprising: a memory and a processor, wherein
   the memory is configured to store a computer program instruction;
   the processor is configured to execute the computer program instruction, causing the electronic device to implement an adjustment method for a rendering hierarchy order,
   the adjustment method for the rendering hierarchy order comprises:
   in response to a first instruction triggered for a target moment position of a video editing timeline track, displaying a rendering hierarchy adjustment panel corresponding to the target moment position; wherein identifiers of a plurality of editing material segments are displayed in the rendering hierarchy adjustment panel according to an initial order, a time interval covered by the plurality of editing material segments on the video editing timeline track comprises the target moment position, the initial order of the identifiers of the plurality of editing material segments is consistent with an initial rendering hierarchy order of the plurality of editing material segments;
   in response to a moving operation for an identifier of at least one editing material segment of the identifiers of the plurality of editing material segments, adjusting a display position of the identifier of the at least one editing material segment in the rendering hierarchy adjustment panel, causing the identifiers of the plurality of editing material segments to be displayed in the rendering hierarchy adjustment panel according to a target order corresponding to the identifiers of the plurality of editing material segments; and
   in response to a second instruction triggered for the rendering hierarchy adjustment panel, determining a target rendering hierarchy order of the plurality of editing material segments according to the target order of the identifiers of the plurality of editing material segments.

14. The electronic device according to claim 13, wherein before the in response to a first instruction triggered for a target moment position of a video editing timeline track, the adjustment method for the rendering hierarchy order further comprises:
   in response to selecting the target moment position on the video editing timeline track as a preview position, rendering images of the plurality of editing material segments at the target moment position according to the initial rendering hierarchy order and displaying the images after being rendered in a preview region;
   after the in response to a second instruction triggered for the rendering hierarchy adjustment panel, the adjustment method for the rendering hierarchy order further comprises: rendering the images of the plurality of editing material segments at the target moment position according to the target rendering hierarchy order and displaying the images after being rendered in the preview region.

15. The electronic device according to claim 13, wherein in response to the first instruction being triggered for an editing material segment of a specified category, the plurality of editing material segments displayed in the rendering hierarchy adjustment panel are all editing material segments of the specified category.

16. The electronic device according to claim 15, wherein the adjustment method for the rendering hierarchy order further comprises:
   in response to a third instruction triggered for the rendering hierarchy adjustment panel, displaying identifiers of editing material segments, whose time intervals covered on the video editing timeline track comprise the target moment position, of all categories in the rendering hierarchy adjustment panel;
   in response to a moving operation for an identifier of at least one editing material segment of the identifiers of the editing material segments of all categories, adjusting a display position of the identifier of the at least one editing material segment of the identifiers of the editing material segments of all categories in the rendering hierarchy adjustment panel, causing the identifiers of the editing material segments of all categories to be displayed in the rendering hierarchy adjustment panel according to a target order corresponding to the identifiers of the editing material segments of all categories; and
   determining a target rendering hierarchical order of the editing material segments of all categories according to the target order of the identifiers of the editing material segments of all categories.

17. The electronic device according to claim 15, wherein the determining a target rendering hierarchy order of the plurality of editing material segments according to the target order of the identifiers of the plurality of editing material segments comprises:
   in response to no editing material segment of an identical category with an editing material segment on which the moving operation is performed existing at a higher hierarchy of the editing material segment on which the moving operation is performed, determining that a next hierarchy of a rendering hierarchy corresponding to the editing material segment on which the moving operation is performed is a hierarchy of an editing material segment of the identical category with the editing material segment on which the moving operation is performed;

in response to the editing material segment of the identical category with the editing material segment on which the moving operation is performed existing at the higher hierarchy of the editing material segment on which the moving operation is performed, determining that a previous hierarchy of the rendering hierarchy corresponding to the editing material segment on which the moving operation is performed is a hierarchy of an editing material segment of the identical category with the editing material segment on which the moving operation is performed; and in response to a rendering hierarchy order of the editing material segment of the specified category before the moving operation is performed being identical to the rendering hierarchy order of the editing material segment of the specified category after the moving operation is performed, not adjusting a rendering hierarchy order of the plurality of editing material segments in all editing material segments corresponding to the target moment position.

18. The electronic device according to claim 13, wherein the adjustment method for the rendering hierarchy order further comprises:

in response to a fourth instruction triggered for the target moment position, creating a newly created editing material segment at the target moment position and determining an initial rendering hierarchy corresponding to the newly created editing material segment according to a preset rendering hierarchy order.

19. The electronic device according to claim 18, wherein the preset rendering hierarchy order is, in descending order, a text, a sticker, a filter, an adjustment, and a picture-in-picture; the determining an initial rendering hierarchy corresponding to the newly created editing material segment according to a preset rendering hierarchy order, comprises:

in response to the newly created editing material segment being the text, determining that the initial rendering hierarchy of the newly created editing material segment is a highest hierarchy;

in response to the newly created editing material segment being the sticker, determining that the initial rendering hierarchy of the newly created editing material segment is lower than a rendering hierarchy of a text editing material segment with a lowest hierarchy;

in response to the newly created editing material segment being the filter or the adjustment, determining that the initial rendering hierarchy of the newly created editing material segment is lower than a rendering hierarchy of a sticker editing material segment with a lowest hierarchy; and in response to the newly created editing material segment being the picture-in-picture, determining that the initial rendering hierarchy of the newly created editing material segment is lower than a rendering hierarchy of a filter or adjustment editing material segment with a lowest hierarchy.

20. A non-transitory computer-readable storage medium, comprising: a computer program instruction, wherein an electronic device executes the computer program instruction, causing the electronic device to implement an adjustment method for the rendering hierarchy order;

the adjustment method for the rendering hierarchy order comprises:

in response to a first instruction triggered for a target moment position of a video editing timeline track, displaying a rendering hierarchy adjustment panel corresponding to the target moment position; wherein identifiers of a plurality of editing material segments are displayed in the rendering hierarchy adjustment panel according to an initial order, a time interval covered by the plurality of editing material segments on the video editing timeline track comprises the target moment position, the initial order of the identifiers of the plurality of editing material segments is consistent with an initial rendering hierarchy order of the plurality of editing material segments;

in response to a moving operation for an identifier of at least one editing material segment of the identifiers of the plurality of editing material segments, adjusting a display position of the identifier of the at least one editing material segment in the rendering hierarchy adjustment panel, causing the identifiers of the plurality of editing material segments to be displayed in the rendering hierarchy adjustment panel according to a target order corresponding to the identifiers of the plurality of editing material segments; and in response to a second instruction triggered for the rendering hierarchy adjustment panel, determining a target rendering hierarchy order of the plurality of editing material segments according to the target order of the identifiers of the plurality of editing material segments.

* * * * *